(12) United States Patent
Umeno

(10) Patent No.: US 7,466,780 B2
(45) Date of Patent: Dec. 16, 2008

(54) PSEUDO-RANDOM NUMBER SEQUENCE FILTER, FILTERING METHOD AND DATA RECORDING MEDIUM

(75) Inventor: Ken Umeno, c/o Comm. Res. Lab., Mnstry. of Publ. Mngmt., Home Affrs., Posts and Telec., 4-2-1, Nukui-Kitamachi, Koganei, Tokyo (JP)

(73) Assignees: Ken Umeno, Koganei-shi (JP); National Institute of Information and Communications Technology, Koganei-shi (JP)

( * ) Notice: Subject to any disclaimer, the term of this patent is extended or adjusted under 35 U.S.C. 154(b) by 46 days.

(21) Appl. No.: 11/491,182

(22) Filed: Jul. 24, 2006

(65) Prior Publication Data

US 2007/0098054 A1    May 3, 2007

Related U.S. Application Data

(62) Division of application No. 09/820,826, filed on Mar. 30, 2001, now Pat. No. 7,099,366.

(30) Foreign Application Priority Data

Apr. 7, 2000    (JP) .............................. 2000-107047

(51) Int. Cl.
*H04B 1/10*    (2006.01)
*G06F 17/10*    (2006.01)

(52) U.S. Cl. ....................................... 375/350; 708/301

(58) Field of Classification Search ......... 375/229–233, 375/350; 708/300, 301, 303, 319, 322, 323
See application file for complete search history.

(56) References Cited

U.S. PATENT DOCUMENTS 4,281,411 A * 7/1981 Bonn et al. ................. 375/232

5,696,819 A * 12/1997 Suizu et al. ............. 379/406.08
5,732,061 A * 3/1998 Kirino et al. ................. 369/116

(Continued)

FOREIGN PATENT DOCUMENTS

EP    1 401 100 A1    3/2004

(Continued)

OTHER PUBLICATIONS

Tohru Kohda, et al., "Pseudonoise Sequences by Chaotic Nonlinear Maps and Their Correlation Properties", IEICE Transactions on Communications, vol. E76-B, No. 8, XP-000396888, Aug. 1993, pp. 855-862.

(Continued)

*Primary Examiner*—Young T. Tse
(74) *Attorney, Agent, or Firm*—Oblon, Spivak, McClelland, Maier & Neustadt, P.C.

(57) ABSTRACT

An FIR filter for filtering a prescribed real impulse constant (r) (−1<r<1) receives in a terminal the input of the input signal of the Chebyshev-chaos type spreading code sequence having a chip length D. A plurality of signals obtained by delaying the input signals by 0, D, 2D, 3D, . . . , and (N−1)D are output by a delay circuit. When the delay time is T, a plurality of delayed and output signals are multiplied by $(-r)^{N-T/D}$ with an amplifier and output, and the sum of a plurality of amplified and output signals, namely an optimum chaos-type spreading code string, is output by an adder.

5 Claims, 14 Drawing Sheets

U.S. PATENT DOCUMENTS

| | | | |
|---|---|---|---|
| 5,781,521 A * | 7/1998 | Kim | 369/59.2 |
| 6,345,069 B1 | 2/2002 | Dabak et al. | |
| 6,445,756 B1 * | 9/2002 | Takahashi | 375/343 |
| 6,636,549 B1 | 10/2003 | Nakamura et al. | |
| 6,661,831 B1 | 12/2003 | Umeno | |
| 2002/0006157 A1 * | 1/2002 | Hunton | 375/146 |

FOREIGN PATENT DOCUMENTS

JP      2000-338869      12/2000

OTHER PUBLICATIONS

Chi-Chung Chen, et al., "Optimal Chaotic Spread Spectrum Sequences for Uplink CDMA Systems", IEEE Symposium on Adaptive Systems for Signal Processing, Communications, and Control, XP-010521626, Oct. 1, 2000, pp. 135-140.

P Gentili, et al., "Evolutionary Design of FIR Digital Filters with Power-of-Two Coefficients", IEEE World Congress on Computational Intelligence, Jun. 27, 1994, pp. 110-114.

In-Soon Park, et al., "Design of Powers-Of-Two Coefficient FIR Filters with Minimum Arithmetic Complexity", vol. 1, Oct. 28, 2002, pp. 517-520.

* cited by examiner

Fig.13 a (Transmitter)
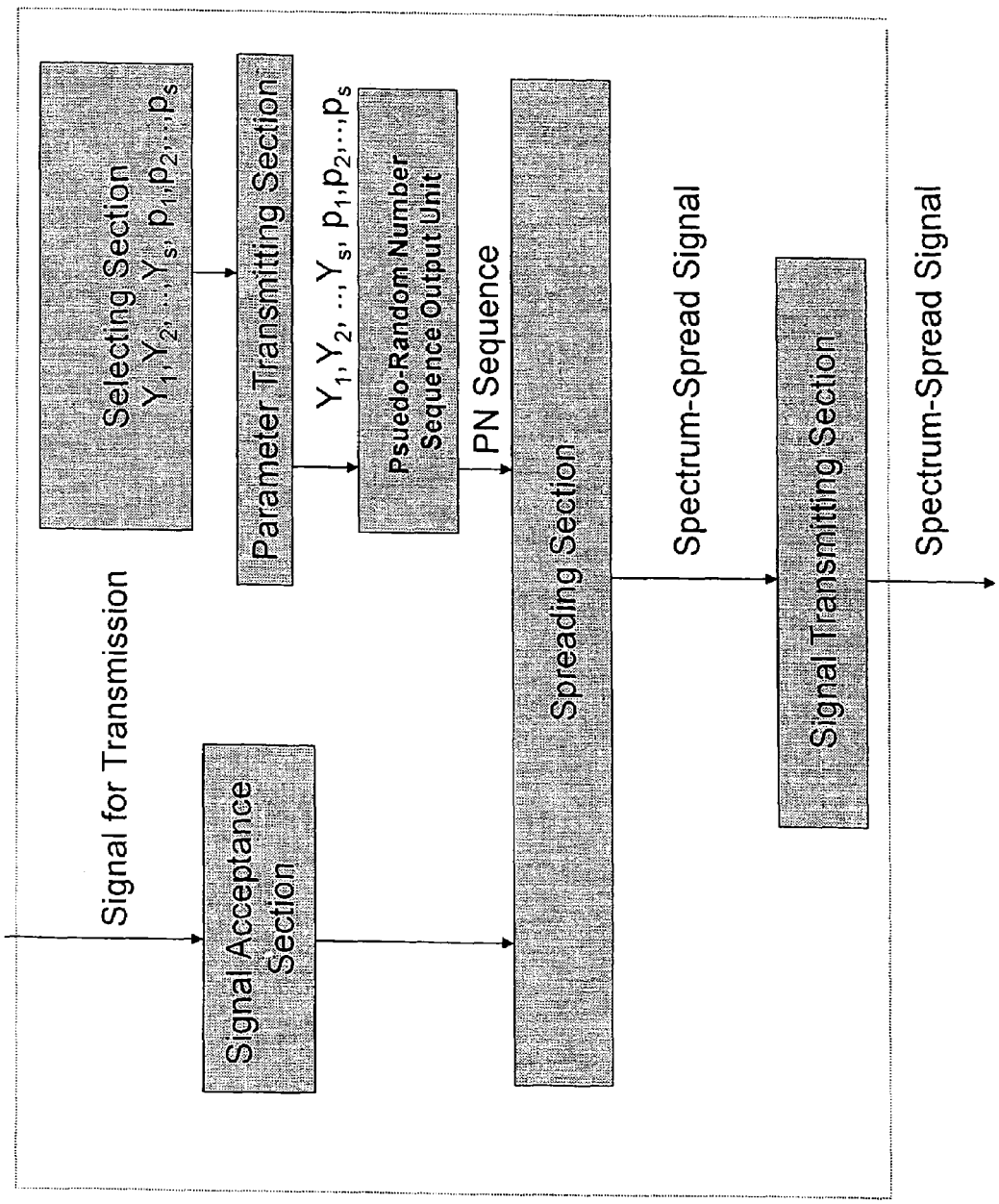

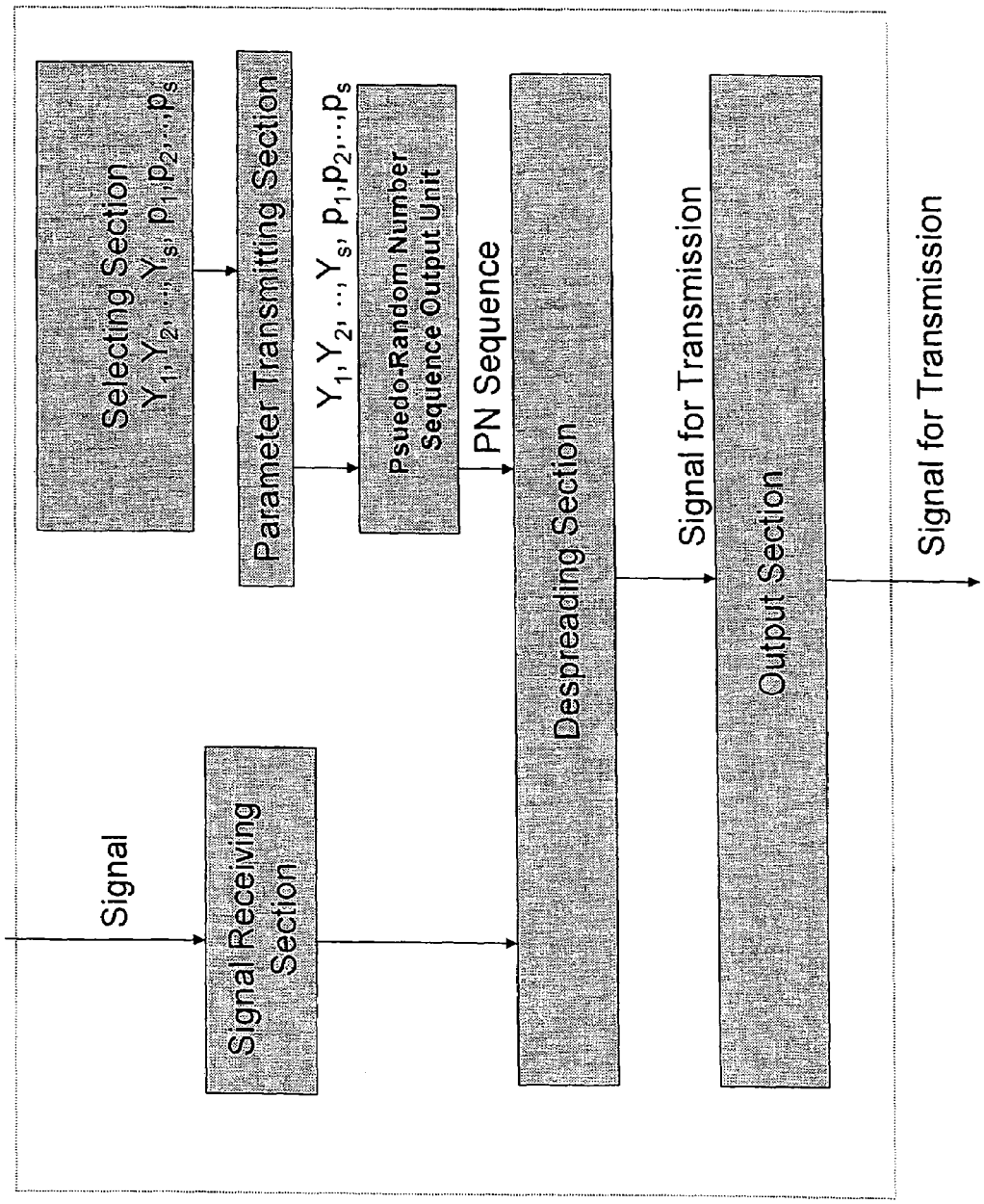
Fig.13b (Receiver)

PSEUDO-RANDOM NUMBER SEQUENCE FILTER, FILTERING METHOD AND DATA RECORDING MEDIUM

CROSS-REFERENCE TO RELATED APPLICATION

This application is a Divisional Application of and claims the benefit of priority under 35 U.S.C §120 from U.S. Ser. No. 09/820,826, (now U.S. Pat. No. 7,099,366), filed Mar. 30, 2001, the entire contents of which, are incorporated herein by reference. The present application also incorporates herein by reference the entire contents of Japanese application number, 2000-107047, filed Apr. 7, 2000.

BACKGROUND OF THE INVENTION

1. Field of the Invention

This invention relates to a pseudo-random number sequence output unit, transmitter, receiver, communication system and filter unit, a pseudo-random number sequence output method, transmission method and receiving method, and a data recording medium.

This invention particularly relates to an output unit and output method suitable for outputting pseudo-random number sequences usable as the spreading codes of an asynchronous CDMA (Code Division Multiple Access) system for satellite, point-to-point, mobile phone and PHS (Personal Handyphone System) communication systems and other land mobile communication systems, and in GPS (Global Positioning System) and other distance measurement fields; a transmitter, receiver, communication system, filter unit, transmission method, receiving method and filtering method using the spreading codes; and a computer-readable data recording medium recorded with a program for implementing any of the foregoing.

2. Description of the Prior Art

Spreading codes developed for enabling spread-spectrum communication systems and code division multiple telecommunication include M sequences, Kasami sequences and Gold sequences generated by an LFSR (Linear Feedback Shift Register). These spreading code sequences have the following two characteristics.

First, the auto-correlation function of codes has a peak and the correlation between different codes (cross-correlation) is near 0. This is very similar to the property of white noise.

Second, when two different spreading codes contained in a code set are selected and the code set is constituted such that the cross-correlation is near 0 regardless of which are selected, the number of codes contained in the code set is small relative to the code length. The number of code types is therefore few.

On the other hand, TDMA (Time Division Multiple Access) and FDMA (Frequency Division Multiple Access) have been known for many years. The asynchronous CDMA communication system differs from these in its feature of enabling despreading by use of the correlation characteristic of the used codes even without positive signal synchronization. It is therefore superior in privacy, secrecy, anti-interference property, anti-jamming property and the like.

Efforts are being made to put CDMA communication into practical use. IMT-2000 (International Mobile Telecommunication 2000), a next-generation wireless telecommunication ITU (International Telecommunication Union) standard, has been selected for adoption.

Recent research shows that the performance of an asynchronous CDMA communication system is determined by inter-code interference noise variance $\sigma$. When pseudo-white noise type spreading codes like Gold sequences or Kasami sequences are used, the interference noise variance $\sigma$ is asymptotically equal to $(K-1)/3N$, where K is the number of simultaneously connected users and N is the code length. (M. B. Pursley, "Performance Evaluation for Phased-Coded Spread-Spectrum Multiple-Access Communication—Part I: System Analysis," IEEE Trans. Communication, vol. 25 (1977) pp. 795-799.)

"Asymptotical" here refers to the case where the user number (number of users) K and the code length N have become large.

The theoretical limit of asynchronous CDMA communication system performance has been considered to be $\sigma=(K-1)/3N$. It is known, however, that the asymptotic relationship holds because the spreading codes are assumed to be pseudo-white noise.

Therefore, when the spreading codes are not pseudo-white noise, i.e., when some degree of correlation is present between different codes, the theoretical limit of performance can be improved.

Spreading codes have recently been discovered that have an auto-correlation function whose inter-code interference noise variance $\sigma$ is lower than that when the spreading codes are pseudo-white noise. Specifically, when the auto-correlation function decreases exponentially with a code shift of 1 in the manner of Eq. (1), the interference noise dispersion $\sigma$ is smaller than in the case of pseudo-white noise.

$$C(l) \approx \mathrm{Const.} \times (-r)^l \quad (-1 < r < 1) \tag{1}$$

In particular, the optimal correlation function (3) is obtained when the real impulse constant r satisfies Eq. (2).

$$\gamma \approx 2 - \sqrt{3} \text{ (must be an equality)} \tag{2}$$

$$\sigma_{optimal} = \frac{\sqrt{3}(K-1)}{6N} \tag{3}$$

This means that at the same bit error rate the number of simultaneously connected users K is 15% greater than the theoretical limit number of users of an asynchronous CDMA communication system using pseudo-white noise as the spreading codes. (G Mazzini, R. Rovatti, G Setti, "Interference Minimization by Auto-correlation Shaping in Asynchronous DS-CDMA Systems: Chaos-based Spreading is Nearly Optimal," IEE Electronic Letters, vol. 35, n. 13, Jun. 24 1999, pp. 1054-1055).

This paper also points out that a correlation function satisfying Eq. (1) can be approximately modeled by generating chaos spreading codes by piecewise-linear maps of very large partial slope.

When an attempt is made to generate such spreading sequences with a DSP (Digital Signal Processor) or the like and utilize them in a mobile phone system, for example, the following problems arise owing to the need for high-speed and low power consumption.

First, owing to the fact that the spreading codes are generated by piecewise-linear maps of very large slope, accurate results cannot be obtained by DSP implementation or computer calculation because of high digit dropout. This makes it difficult to construct a physical circuit or device for generating the spreading codes.

Second, the piecewise-linear maps with the parameter that determines how the correlation function attenuates cannot be freely designed with respect to an arbitrary r ($-1 < r < 1$).

Third, the Mazzini et al. paper points out that few types of the piecewise-linear maps have correlation functions near optimal. It is, however, desirable to have as many types of codes as possible for realizing a CDMA communication system. Actual configuration of a CDMA communication system using the method taught by this paper is therefore difficult.

Fourth, in the case of spreading codes generated using a linear shift register, only 0(N) types of codes having a good correlation characteristic with respect code length N are available. This is very few relative the original number of code types, which is proportional to the power of 2 $O(2^N)$. It is therefore difficult to cope with an increase in the number of users.

Fifth, the small key space makes decoding possible with little time or trouble. Communication security is therefore poor.

The teachings of this paper offer no remedy for any of these five problems.

A need has therefore been strongly felt for a technology for overcoming these problems that is capable of generating spreading codes consisting of pseudo-random number sequences (also called PN (Pseudo-Noise) sequences) suitable for an asynchronous CDMA communication system.

An object of the present invention is to provide a pseudo-random number sequence output unit, transmitter, receiver, communication system and filter unit, and a pseudo-random number sequence output method, transmission method, receiving method and filtering method that are suitable for an asynchronous CDMA communication system, and a data recording medium recorded with a program for implementing any of the foregoing.

SUMMARY OF THE INVENTION

The invention that achieves this object will now be explained in terms of its principle.

In a first aspect, the present invention provides a pseudo-random number sequence output unit comprising an input acceptance section, a calculation section and an output section, which output unit is responsive to s ($1 \leq s$) number of prescribed positive integers $q_1, q_2, \ldots, q_s$, a prescribed real impulse constant r ($-1 < r < 1$), and a prescribed nonzero real constant C for outputting a pseudo-random number sequence of length N ($1 \leq N$).

The input acceptance section accepts input of:

s ($1 \leq s$) number of real number sequence initial values $Y_1, Y_2, \ldots, Y_s$ ($-1 < Y_1 < 1, -1 < Y_2 < 1, \ldots, -1 < Y_s < 1$); and s number of integer parameters $p_1, p_2, \ldots, p_s$ ($2 \leq p_1, 2 \leq p_2, \ldots 2 \leq p_s$) for which $q_1$ mod $p_1 \neq 0$, $q_2$ mod $p_2 \neq 0 \ldots, q_s$ mod $p_s \neq 0$ respectively hold with respect to the prescribed positive integers $q_1, q_2 \ldots q_s$.

The calculation section uses the prescribed real impulse constant r, the prescribed non-zero constant C, the sequence initial values $Y_1, Y_2, \ldots, Y_s$, the integer parameters $p_1, p_2, \ldots, p_s$, the prescribed positive integers $q_1, q_2, \ldots, q_s$ and integers j ($1 \leq j \leq s$), m ($1 \leq m \leq 2N-2$) and n ($1 \leq n \leq 2N-1$) to calculate from the recurrence formula:

[$T(p, \cos\theta) - \cos(p\theta) => T(p, \cos\theta) = \cos(p\theta)$]

$$T_p(\cos\theta) = T(p, \cos\theta) - \cos(p\theta) \qquad (4)$$

$$y_j[1] = Y_j$$

-continued
$$y_j[m+1] = T(p_j, y_j[m])$$

$$z[n] = \prod_{j=1}^{s} T(q_j, y_j[n])$$

a pseudo-random number sequence z'[1], z'[2], ..., z'[N] of length N that satisfies:

$$[\sum_{j=1}^{N} \wedge \{N\} => C \sum_{j=1}^{N} \wedge \{N\} \text{ for any } z'[j], \qquad (5)$$
$$j = 1, \ldots N]$$

$$z'[1] = C \sum_{j=1}^{N} (-r)^j z[j],$$

$$z'[2] = C \sum_{j=1}^{N} (-r)^j z[j+1],$$

$$z'[N] = C \sum_{j=1}^{N} (-r)^j z[j+N-1].$$

The output section outputs the pseudo-random number sequence z'[1], z'[2], ..., z'[N].

The pseudo-random number sequence output unit according to the present invention can be constructed so that the sequence initial values $Y_1, Y_2, \ldots, Y_s$ satisfy:

$$y_k[2] = T(p_k, Y_k)$$

$$y_k[m+1] = T(p_k, y_k[m])$$

$$Y_k = y_k[N+1] = T(p_k, y_k[N]) \qquad (6)$$

with respect to an integer k ($1 \leq k \leq s$) and an integer m ($1 \leq m \leq N$).

The pseudo-random number sequence output unit according to the present invention can be constructed so that the prescribed real impulse constant r satisfies:

$$2-\sqrt{3}-0.1 \leq r \leq 2-\sqrt{3}+0.1. \qquad (7)$$

The pseudo-random number sequence output unit according to the present invention can be constructed so that every prescribed positive integer $q_1, q_2 \ldots q_s$ is 1.

In a second aspect, the present invention provides a transmitter comprising an input acceptance section, the aforesaid pseudo-random number sequence output unit, a spreading section, and a signal transmitting section.

The input acceptance section accepts input of a signal for transmission.

The output unit outputs a pseudo-random number sequence of length N.

The spreading section uses the output pseudo-random number sequence of length N as a spreading code to spectrum-spread the signal for transmission whose input was accepted.

The signal transmitting section transmits the spectrum-spread signal.

The transmitter of the present invention can further comprise a selecting section and a parameter transmitting section.

The selecting section selects sequence initial values $Y_1, Y_2, \ldots, Y_s$ and integer parameters $p_1, p_2, \ldots, p_s$.

The parameter transmitting section transmits the selected sequence initial values $Y_1, Y_2, \ldots, Y_s$ and integer parameters $p_1, p_2, \ldots, p_s$.

The output unit accepts input of the selected sequence initial values $Y_1, Y_2, \ldots, Y_s$ and integer parameters $p_1, p_2, \ldots, p_s$ and outputs a pseudo-random number sequence of length N.

The transmitter of the present invention can further comprise a parameter receiving section.

The parameter receiving section receives sequence initial values $Y_1, Y_2, \ldots, Y_s$ and integer parameters $p_1, p_2, \ldots, p_s$.

The output unit accepts input of the received sequence initial values $Y_1, Y_2, \ldots, Y_s$ and integer parameters $p_1, p_2, \ldots, p_s$ and outputs a pseudo-random number sequence of length N.

In a third aspect, the present invention provides a receiver comprising a signal receiving section, the aforesaid pseudo-random number sequence output unit, an inverse spreading section and an output section.

The signal receiving section receives a signal.

The output unit outputs a pseudo-random number sequence of length N.

The inverse spreading section uses the output pseudo-random number sequence of length N as a spreading code to inversely spectrum-spread the received signal.

The output section outputs the inversely spectrum-spread signal as a signal for transmission.

The receiver of the present invention can further comprise a selecting section and a parameter transmitting section.

The selecting section selects sequence initial values $Y_1, Y_2, \ldots, Y_s$ and integer parameters $p_1, p_2, \ldots, p_s$.

The parameter transmitting section transmits the selected sequence initial values $Y_1, Y_2, \ldots, Y_s$ and integer parameters $p_1, p_2, \ldots, p_s$.

The output unit accepts input of the selected sequence initial values $Y_1, Y_2, \ldots, Y_s$ and integer parameters $p_1, p_2, \ldots, p_s$ and outputs a pseudo-random number sequence of length N.

The receiver of the present invention can further comprise a parameter receiving section.

The parameter receiving section receives sequence initial values $Y_1, Y_2, \ldots, Y_s$ and integer parameters $p_1, p_2, \ldots, p_s$.

The output unit accepts input of the received sequence initial values $Y_1, Y_2, \ldots, Y_s$ and integer parameters $p_1, p_2, \ldots, p_s$ and outputs a pseudo-random number sequence of length N.

In a fourth aspect, the present invention provides a communication system comprising the aforesaid transmitter and receiver.

The receiver receives sequence initial values $Y_1, Y_2, \ldots, Y_s$ and integer parameters $p_1, p_2, \ldots, p_s$ transmitted by the transmitter.

The receiver also receives a signal transmitted by the transmitter.

In a fifth aspect, the present invention provides a communication system comprising the aforesaid transmitter and receiver.

The transmitter receives sequence initial values $Y_1, Y_2, \ldots, Y_s$ and integer parameters $p_1, p_2, \ldots, p_s$ transmitted by the receiver.

The receiver receives a signal transmitted by the transmitter.

In a sixth aspect, the present invention provides a filter unit comprising an input terminal, a delay section, an amplifying section, an adder section and an output terminal, which filter unit filters according to a prescribed real impulse constant r ($-1 < r < 1$).

The input terminal accepts input of an input signal of chip length D.

The delay section outputs a plurality of signals produced by delaying the input signal whose input was accepted by 0, D, 2D, 3D, ..., (N-1)D.

The amplifying section amplifies the delayed output signals $(-r)^{(N-T)/D}$ times, where T is the delay time, and outputs the amplified signals.

The adder section sums the output amplified signals and outputs the resulting sum signal.

The output terminal outputs the output sum signal.

The delay section, amplifying section and adder section of the filter of the present invention can be constituted as an ASIC (Application Specific Integrated Circuit), a DSP (Digital Signal Processor) or an FPGA (Field Programmable Gate Array).

In a seventh aspect, the present invention provides a pseudo-random number sequence output method comprising an input acceptance step, a calculation step and an output step, which method is responsive to s ($1 \leq s$) number of prescribed positive integers $q_1, q_2, \ldots, q_s$, a prescribed real impulse constant r ($-1 < r < 1$), a prescribed non-zero real constant C for producing a pseudo-random number sequence of length N ($1 \leq N$).

In the input acceptance step, input is accepted of:

s ($1 \leq s$) number of real number sequence initial values $Y_1, Y_2, \ldots, Y_s$ ($-1 < Y_1 < 1, -1 < Y_2 < 1, \ldots, -1 Y_s < 1$); and s number of integer parameters $p_1, p_2, \ldots, p_s$ ($2 \leq p_1, 2 \leq p_2, \ldots 2 \leq p_s$) for which $q_1$ mod $p_1 \neq 0$, $q_2$ mod $p_2 \neq 0 \ldots, q_s$ mod $p_s \neq 0$ respectively hold with respect to the prescribed positive integers $q_1, q_2 \ldots q_s$.

In the calculation step, the prescribed real impulse constant r, the prescribed nonzero real constant C, the sequence initial values $Y_1, Y_2, \ldots, Y_s$, the integer parameters $p_1, p_2, \ldots, p_s$, the prescribed positive integers $q_1, q_2, \ldots, q_s$ and integers j ($1 \leq j \leq s$), m ($1 \leq m \leq 2N-2$) and n ($1 \leq n \leq 2N-1$) are used to calculate from the recurrence Formula (4) a pseudo-random number sequence $z'[1], z'[2], \ldots, z'[N]$ of length N that satisfies (5).

In the output step, the pseudo-random number sequence $z'[1], z'[2], z'[N]$ is output.

The pseudo-random number sequence output method according to the present invention can be constructed so that the sequence initial values $Y_1, Y_2, \ldots, Y_s$ satisfy (6) with respect to an integer k ($1 \leq k \leq s$) and an integer m ($1 \leq m \leq N$).

The pseudo-random number sequence output method according to the present invention can be constructed so that the prescribed real impulse constant r satisfies (7).

The pseudo-random number sequence output method according to the present invention can be constructed so that every prescribed positive integer $q_1, q_2 \ldots q_s$ is 1.

In an eighth aspect, the present invention provides a transmission method comprising an input acceptance step, an output step, a spreading step and a signal transmitting step.

In the input acceptance step, input of a signal for transmission is accepted.

In the output step, a pseudo-random number sequence of length N is output by the aforesaid pseudo-random number sequence output method.

In the spreading step, the output pseudo-random number sequence of length N is used as a spreading code to spectrum-spread the signal for transmission whose input was accepted.

In the signal transmitting step, the spectrum-spread signal is transmitted.

The transmission method of the present invention can further comprise a selecting step and a parameter transmitting step.

In the selecting step, sequence initial values $Y_1, Y_2, \ldots, Y_s$ and integer parameters $p_1, p_2, \ldots, p_s$ are selected.

In the parameter transmitting step, the selected sequence initial values $Y_1, Y_2, \ldots, Y_s$ and integer parameters $p_1, p_2, \ldots, p_s$ are transmitted.

In the output step, input of the selected sequence initial values $Y_1, Y_2, \ldots, Y_s$ and integer parameters $p_1, p_2, \ldots, p_s$ is accepted and a pseudo-random number sequence of length N is output.

The transmission method of the present invention can further comprise a parameter receiving step.

In the parameter receiving step, sequence initial values $Y_1, Y_2, \ldots, Y_s$ and integer parameters $p_1, p_2, \ldots, p_s$ are received.

In the output step, input of the received sequence initial values $Y_1, Y_2, \ldots, Y_s$ and integer parameters $p_1, p_2, \ldots, p_s$ is accepted and a pseudo-random number sequence of length N is output.

In a ninth aspect, the present invention provides a receiving method comprising a signal receiving step, an output step, an inverse spreading step and an output step.

In the signal receiving step, a signal is received.

In the output step, a pseudo-random number sequence of length N is output by the aforesaid pseudo-random number sequence output method.

In the inverse spreading step, the output pseudo-random number sequence of length N is used as a spreading code to inversely spectrum-spread the received signal.

In the output step, the inversely spectrum-spread signal is output as a signal for transmission.

The receiving method of the present invention can further comprise a selecting step and a parameter transmitting step.

In the selecting step, sequence initial values $Y_1, Y_2, \ldots, Y_s$ and integer parameters $p_1, p_2, \ldots, p_s$ are selected.

In the parameter transmitting step, the selected sequence initial values $Y_1, Y_2, \ldots, Y_s$ and integer parameters $p_1, p_2, \ldots, p_s$ are transmitted.

In the output step, input of the selected sequence initial values $Y_1, Y_2, \ldots, Y_s$ and integer parameters $p_1, p_2, \ldots, p_s$ is accepted and a pseudo-random number sequence of length N is output.

The receiving method of the present invention can further comprise a parameter receiving step.

In the parameter receiving step, sequence initial values $Y_1, Y_2, \ldots, Y_s$ and integer parameters $p_1, p_2, \ldots, p_s$ are received.

In the output step, input of the received sequence initial values $Y_1, Y_2, \ldots, Y_s$ and integer parameters $p_1, p_2, \ldots, p_s$ is accepted and a pseudo-random number sequence of length N is output.

In a tenth aspect, the present invention provides a filtering method comprising an input step, a delaying step, an amplifying step, a summing step and an output step, which filtering method filters according to a prescribed real impulse constant r ($-1 < r < 1$).

In the input step, input of an input signal of chip length D is accepted.

In the delaying step, a plurality of signals produced by delaying the input signal whose input was accepted by 0, D, 2D, 3D, ..., (N−1)D are output.

In the amplifying step, the delayed output signals are amplified $(-r)^{(N-T)/D}$ times, where T is the delay time, and the amplified signals are output.

In the summing step, the output amplified signals are summed and the resulting sum signal is output.

In the output step, the output sum signal is output.

In the present invention, the sequence initial values $Y_k$ ($1 \leq k \leq s$) can be defined as the periodic points of period N of the dynamical system $X_{n+1} = T(p_k, X_n)$ obtained by chaos mapping $T(p_k, \cdot)$. Use of this periodic property eliminates redundant calculation to enable high-speed pseudo-random number generation.

A program for implementing the pseudo-random number sequence output unit, transmitter, receiver, filter unit and communication system, and the pseudo-random number sequence output method, transmission method, receiving method and filtering method can be recorded on a computer-readable data recording medium such as a compact disk, floppy disk, hard disk, magneto-optical disk, digital video disk, magnetic tape or semiconductor memory.

The processing performed in the aforesaid pseudo-random number sequence output unit, transmitter, receiver, communication system and filter unit, and the pseudo-random number sequence output method, transmission method, receiving method and filtering method can be implemented by running the program recorded on a computer-readable data recording medium of the present invention on any of various devices equipped with a memory, processor, output device, communication device and the like, including, for example, a mobile terminal device such as a general-purpose computer, mobile phone unit, PHS unit or game device, a parallel computer or other data processing system, a DSP (Digital Signal Processor), or an FPGA (Field Programmable Gate Array).

The computer-readable data recording medium recorded with a program of the present invention can be distributed and marketed independently of data processing equipment.

The above and other objects and features of the invention will become apparent from the following description made with reference to the drawings.

BRIEF EXPLANATION OF THE DRAWINGS

FIGS. 13*a* and 13*b* illustrate an embodiment of a transmitter and a receiver according to the present invention.

DESCRIPTION OF THE PREFERRED EMBODIMENTS

Embodiments of the present invention will now be explained. It should be noted that the embodiments set out in the following are solely for the purpose of illustration and do not limit the scope of the present invention. Although a person skilled in the art will be able to adopt embodiments in which some or all elements are replaced with equivalent ones, such embodiments also fall within the scope of the appended claims for patent.

First Embodiment

Figure 1:
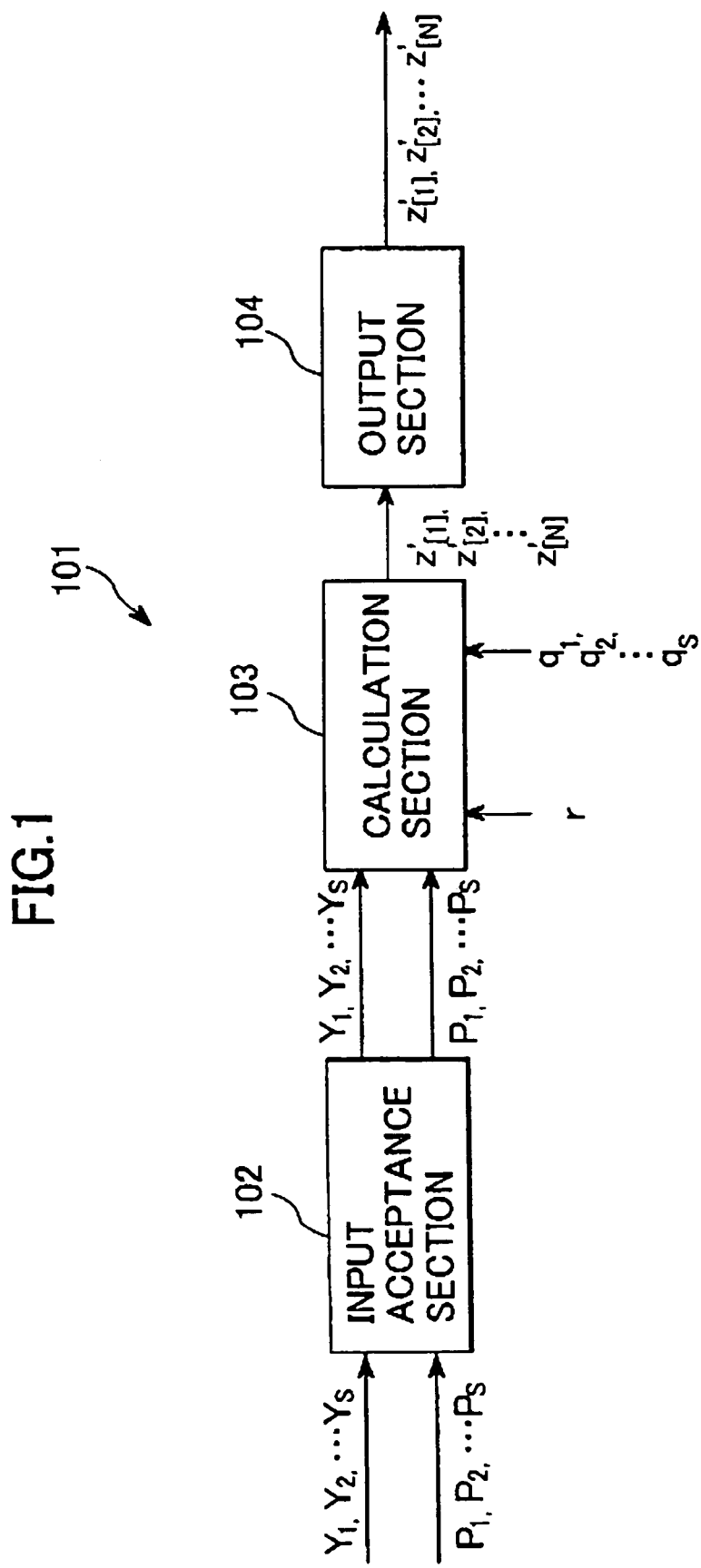
FIG. 1 is a schematic diagram showing the general configuration of a pseudo-random number sequence output unit according to the present invention.

FIG. 1 is a schematic diagram (data flow chart) showing the general configuration of a pseudo-random number sequence output unit 101 that is a first embodiment of the present invention. Explanation will now be made with reference to this figure.

The pseudo-random sequence output unit 101 of this embodiment is equipped with an input acceptance section 102, a calculation section 103 and an output section 104. It outputs a pseudo-random number sequence of length N ($1 \leq N$) in response to s ($1 \leq s$) number of prescribed positive integers $q_1, q_2, \ldots, q_s$, a prescribed real impulse constant r ($-1 < r < 1$) and a prescribed nonzero real constant C.

The input acceptance section 102 accepts input of the following sequence initial values and integer parameters:

s number of real number sequence initial values $Y_1, Y_2, \ldots, Y_s$; provided that $-1 < Y_1 < 1, -1 < Y_2 < 1, \ldots, -1 < Y_s < 1$, s number of integer parameters $p_1, p_2, \ldots, p_s$; provided that $2 \leq p_1, 2 \leq p_2, \ldots 2 \leq p_s$ and for which $q_1$ mod $p_1 \neq 0$, $q_2$ mod $p_2 \neq 0 \ldots$, $q_s$ mod $p_s \neq 0$ respectively hold with respect to the prescribed positive integers $q_1, q_2 \ldots q_s$.

The calculation section 103 uses the prescribed real impulse constant r, the prescribed nonzero real constant C, the sequence initial values $Y_1, Y_2, \ldots, Y_s$ whose input was accepted, the integer parameters $p_1, p_2, \ldots, p_s$, the prescribed positive integers $q_1, q_2, \ldots, q_s$ and integers j ($1 \leq j \leq s$), m ($1 \leq m \leq 2N-2$) and n ($1 \leq n \leq 2N-1$) to calculate from the recurrence Formula (4) a pseudo-random number sequence $z'[1], z'[2], \ldots, z'[N]$ of length N that satisfies (5).

The output section 104 outputs the calculated pseudo-random number sequence $z'[1], z'[2], \ldots, z'[N]$.

Figure 2:
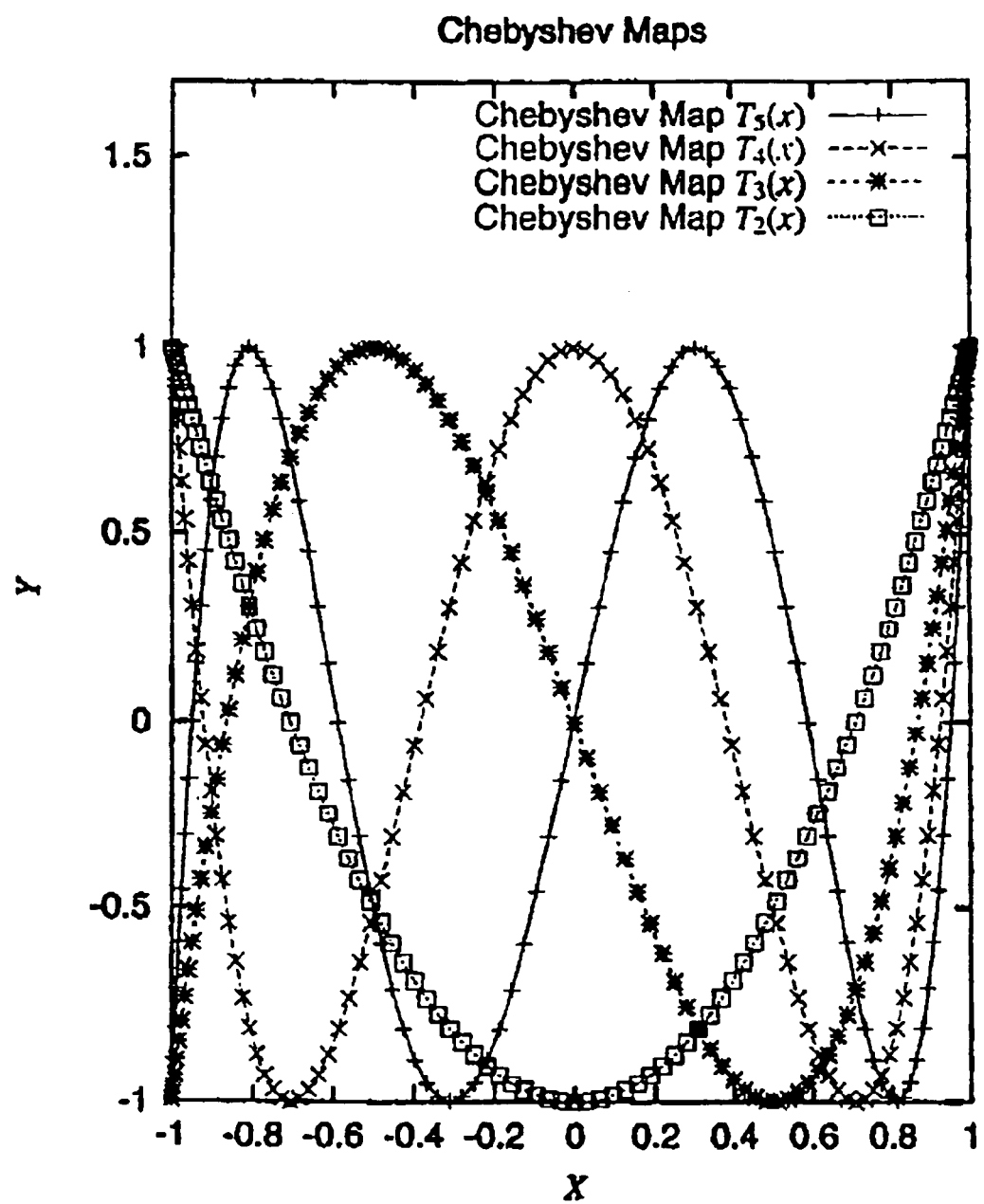
FIG. 2 is a graph illustrating Chebyshev maps.

FIG. 2 is a graph showing Chebyshev polynomials used by the calculation section 103. A Chebyshev polynomial can be defined according to the cosine function addition theorem as $T(a, \cos \theta) = \cos(a\theta)$, where integer a represents the order. On the other hand, direct expression by rational polynomials is possible as follows:

$T(0, x) = 1$ $T(1, x) = x$ $T(2, x) = 2x^2 - 1$ $T(3, x) = 4x^3 - 3x$

All Chebyshev polynomials $y = T(a, x)$ are rational maps that map the closed interval $-1 <= x <= 1$ to the closed interval $-1 <= y <= 1$.

In FIG. 2, the Chebyshev polynomials of orders 2 to 5 are graphed in the form of $y = T(2, x)$, $y = T(3, x)$, $y = T(4, x)$ and $y = T(5, x)$. The abscissa is the x-axis and the ordinate is the y-axis.

The calculation performed by the calculation section 103 can be implemented by polynomial arithmetic using a computer or by an adder-subtracter and multiplier in combination. It can also be implemented by floating-point arithmetic with a prescribed degree of accuracy assurance or by arithmetic using rational numbers. This will be discussed later.

In the case of a computer, sequence initial value and integer parameter input acceptance by the input acceptance section 102 and output by the output section 104 can be conducted via registers in the computer RAM (Random Access Memory) or CPU (Central Processing Unit), and, in the case of an electronic circuit, by use of latches or the like.

Since, as can be seen from the recurrence formula set out earlier, the calculations for determining $z'[1], z'[2], \ldots, z'[N]$ are mutually independent, they can be conducted in parallel at N of maximum parallelism. As the calculations are expressed by a recurrence formula, moreover, they can be easily carried out by repeated computation using a program loop.

The fact that the correlation function of the output pseudo-random number sequence of length N output by this embodiment becomes the optimum correlation function is based on the Lebesgue spectrum theory evolved within the ergodic theory. This theory is explained by V. I. Arnold and A. Avez in "Ergodic Problems of Classical Mechanics" (W. A. Benjamin, New York, 1968).

The Lebesgue spectrum theory will be explained in the following.

Assume that sequence $X_1, X_2 \ldots$ generated from the dynamical system $X_{n+1} = F(X_n)$ is ergodic with respect to the limit density distribution function (invariant measure) $\sigma(x)$ dx on domain M defined by the dynamical system.

Then, from the inner product $<u, v> = \int_M u(x) v(x) \rho(x) dx$, a Hilbert space $L_2$ whose naturally normed calculation $\|\cdot\|$ is $\|v\|^2 = (v, v)$ can be considered.

According to the foregoing paper, an orthonormal basis (8) satisfying a special property for an arbitrary ergodic dynamical system is uniquely present in this space $L_2$. This is called the Lebesgue spectrum.

$$\{\phi_{\lambda,j}\}_{\lambda \in \Lambda, j \in J} \quad (8)$$

$\lambda$ here labels the individual Lebesgue spectrum classes and j is a label designating the class function and j takes a countably infinite number of non-negative integers.

It follows from this definition that the Lebesgue spectrum is an orthornomal system of functions composed of an infinite number of functions. In the particular case where the label X can take an infinite number of types, (cardinality of $\Lambda$), the Lebesgue spectrum is called an "infinite Lebesgue spectrum."

A special property possessed by the foregoing Lebesgue spectrum is that it satisfies Eq. 9.

$\phi_{\lambda,j} \circ F(x) = \phi_{\lambda,j+1}(x)$ (for $\forall \lambda \in \Lambda, \forall j \in J$) \quad (9)

In other words, if the function (10) below is given, the other class $\lambda$ Lebesgue spectrum functions of (11) can all be obtained by repeatedly applying map $F(\cdot)$ defining the dynamical system.

$$\phi_{\lambda,0} \quad (10)$$

$$\{\phi_{\lambda,j}\}_{j \geq 1} \quad (11)$$

From the assumption that the Lebesgue spectrum constitutes an orthonormal system, it follows that all of these functions (12) are orthogonal to arbitrary other functions (13) of the same class and arbitrary functions (14) of other classes.

$$\phi_{\lambda,j} \quad (12)$$

$$\phi_{\lambda,j'} \quad (13)$$

$$\phi_{\lambda',j''} \quad (14)$$

One ergodic dynamic system having an infinite Lebesgue spectrum is the Chebyshev chaotic dynamical system given by the quadratic or higher order Chebyshev polynomial discussed below. The Chebyshev chaos dynamical system is explained by R. L. Alder and T. J. Rivlin in "Proc. Am. Math. Soc. 15" (1964, p 794).

Assume that function B(x) in $L_2$ can be expanded in terms of a Lebesgue spectrum as in Eq. (15).

$$B(x) = \sum_{j=1}^{N} a_{\lambda,j} \phi_{\lambda,j}(x) \tag{15}$$

In this case, it follows from the orthogonality of functions with different Lebesgue spectrum that correlation function (16) is given by the Lebesgue spectrum expansion coefficients as in (17).

$$\langle (B)x), B(F^l(x)) \rangle = \langle B_0, B_l \rangle \tag{16}$$

$$\langle B_0, B_l \rangle = \sum_{m=l}^{\infty} a_{\lambda,m} a_{\lambda,m-l} \tag{17}$$

This correlation function is equal to the time-average (18) because of the ergodicity.

$$\overline{B(x)B(F^l(x))} = \lim_{N \to \infty} \sum_{n=1}^{N} B(X_n)B(X_{n+1}) \tag{18}$$

Here, each $X_n$ is generated by recurrence formula $X_{n+1} = F(X_n)$ and the ergodic equality showing this time-average to be equal to the space-average holds for $X_1$ on almost everywhere M.

Here, (19) is assumed.

$$\alpha_{\lambda,m} = C(-r)^m (m=0,1,\ldots) \tag{19}$$

When this is substituted into the foregoing equation giving the correlation function, (20) is obtained and the correlation function decreases exponentially as in (21).

$$\langle B_0, B_l \rangle = C^2(-r)^l \frac{1-r^{2N}}{1-r^2} \tag{20}$$

$$C(l) \equiv \langle B_0, B_l \rangle = C'(-r)^l (N \to \infty) \tag{21}$$

A sequence having a correlation function that exponentially damps in the form of $(-r)^l$ relative to a code shift amount 1 can thus be freely generated with respect to an arbitrary r $(-1 < r < 1)$.

In particular, as discovered by Mazzini et al. at the same bit error rate the number of theoretical connected users can, in the case of Eq. (2), be increased 15% over the number when the spreading sequences are defined by random codes (including Gold codes and bulk codes).

As regards interference noise variance, it suffices if the recurrent approximation behavior of the spreading sequences of (3) becomes as shown by Eq. (1) and Eq. (2). It is therefore adequate to provide an ergodic dynamic system having a Lebesgue spectrum and a filter designed in the manner of (22) at the foregoing B(x) defined by the Lebesgue spectrum function of the ergodic dynamic system.

$$\alpha_{\gamma,m} = C(-r)^m, r=2-\sqrt{3}(m=0,1,\ldots) \tag{22}$$

The issue at this point is how the ergodic dynamic system F(x) and Lebesgue spectrum (8) can be constructed to be readily realizable. This will now be explained with regard to a configuration utilizing Chebyshev maps.

Consider a second or higher order Chebyshev polynomial $T_p$ ($p \geq 2$). As mentioned earlier, this Chebyshev polynomial is defined as $T_p(\cos \theta) = \cos(p\theta)$ and, as indicated by (24), is known to have the orthogonal property with respect to the distribution function (23) on closed interval $M=[-1, 1]$.

$$\rho(x)dx = \frac{dx}{\pi\sqrt{1-x^2}} \tag{23}$$

$$\int_M T_p(x)T_q(x)\rho(x)dx = 0 \text{ (for } q \neq p) \tag{24}$$

A Hilbert space $L_2$ can be constituted by these Chebyshev polynomials and the distribution function. In this case, the Chebyshev polynomials themselves are orthonormal bases possessing a complete property in the Hilbert space $L_2$.

The foregoing paper also reports that it is a property of a dynamical system given by Chebyshev maps with p>1 to have not only ergodicity but also still stronger mixing property. The ergodic invariant measure in this case is given by the density function $\rho(x)$ that defines the foregoing orthogonality.

From these properties, the system of functions $\phi_{q,j}(x)$ is defined as in (25).

$$\phi_{q,j}(x) = Y_{qp^j}(x)(j \geq 0, q(\text{mod} p) \neq 0) \tag{25}$$

From the orthogonality of the Chebyshev polynomials themselves and the relationship of (26), it can be seen that the system of functions $\phi_{q,j}(x)$ is a Hilbert spectrum.

$$\phi_{q,j} \circ T_p(x)$$

$$= T_{qp^j} \circ T_p(x)$$

$$= T_{qp^{j+1}}(x)$$

$$= \phi_{q,j+1}(x) \tag{26}$$

Therefore, if the filter is designed in the manner of (27), explicit solution of the aforesaid Lebesgue spectrum theory correlation function enables configuration of spreading codes for an asynchronous CDMA telecommunication system that have the correlation function of Eq. (1). As explained earlier, this is indicated by Mazzini et al. and enables a 15% increase in number of users under a given bit error rate of an asynchronous CDMA compared to the conventional cases based on ordinary random codes.

$$B(x) = \sum_{j=1}^{N} (-r)^j \phi_{q,j}(x) \tag{27}$$

$$= \sum_{j=1}^{N} (-r)^j T_{qp^j}(x)$$

Here, (28) and (29) hold and it is noted that they become (30) and (31) for an arbitrary integer m ($0 \leq m \leq N-1$).

$$B(X_1) = \sum_{j=1}^{N} (-r)^j \phi_{q,j}(X_1) \quad (28)$$

$$= \sum_{j=1}^{N} (-r)^j T_{q p^j}(X_1)$$

$$B(X_1) = \sum_{j=1}^{N} (-r)^j T_q(X_{1+j}) \quad (29)$$

$$B(X_m) = \sum_{j=1}^{N} (-r)^j \phi_{q,j}(X_m) \quad (30)$$

$$= \sum_{j=1}^{N} (-r)^j T_{q p^{j+m-1}}(X_1)$$

$$B(X_m) = \sum_{j=1}^{N} (-r)^j T_q(X_{m+j}) \quad (31)$$

When q=1, function B(X) becomes $T_q(x)=x$ and (32) holds.

$$B(X_m) = \sum_{j=1}^{N} (-r)^j X_{m+j} \quad (32)$$

This amounts to multiplying each element of the sequence $X_{m+1}, X_{m+2}, \ldots, X_{m+j}, \ldots, X_{m \cdot N-1}, X_{m+N}$, ($0 \leq m \leq N-1$) by the constant given by $(-r)^j$ and summing the products.

This is nothing other than the operation of an FIR filter (Finite Impulse Response Filter), one of the basic filters used in digital signal processing.

Therefore, the FIR filter calculation of the present invention can be readily implemented with existing DSP technology.

Figure 3:
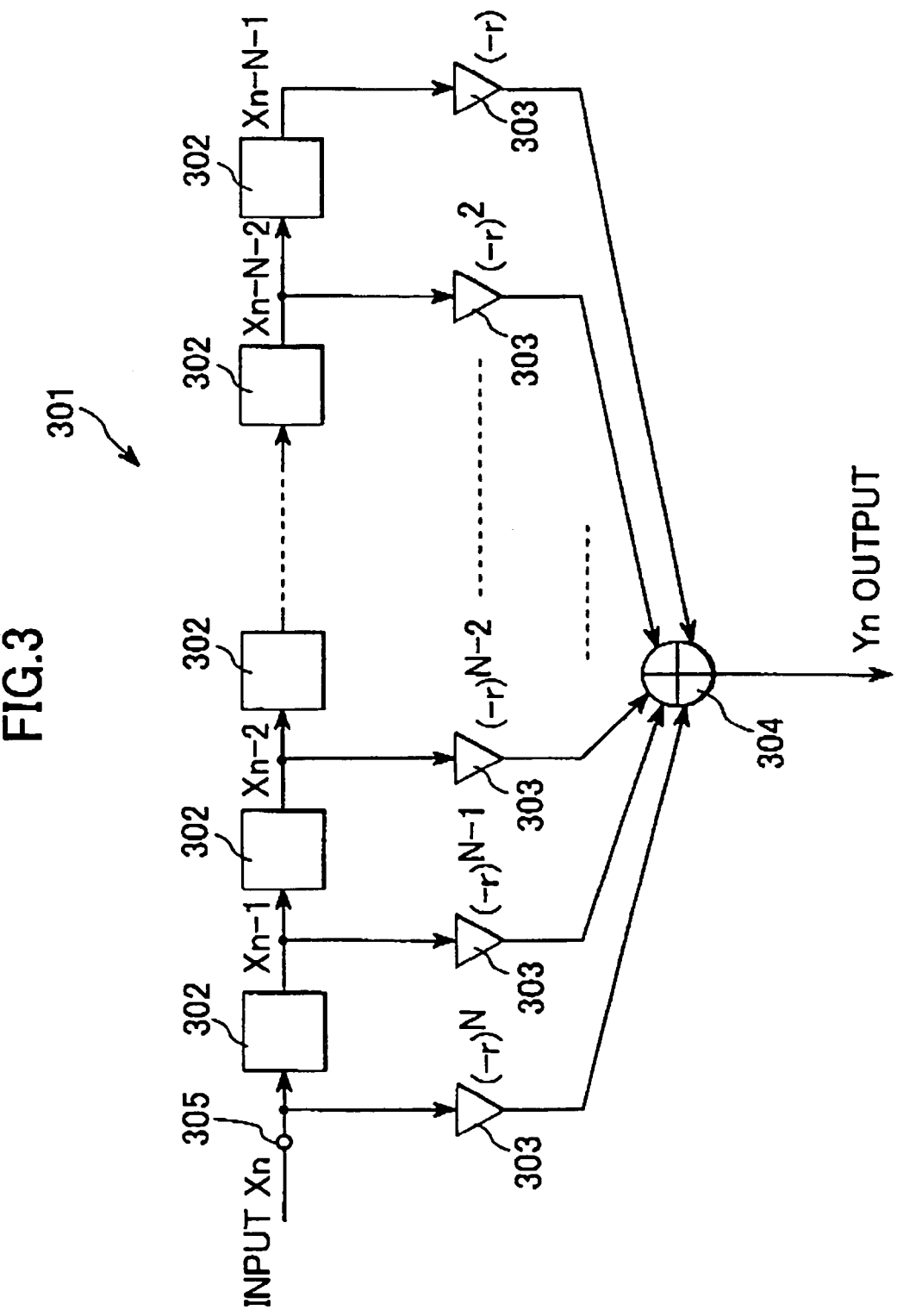
FIG. 3 is a schematic diagram showing the general configuration of an FIR filter usable in an embodiment of the present invention.

FIG. 3 is a schematic diagram showing the general configuration of an FIR filter 301 constructed in this manner.

The FIR filter 301 accepts a Chebysev chaos-type spreading code sequence $X_1, X_2, X_3, \ldots$ input at a terminal 305.

The accepted Chebysev chaos-type spreading code sequence is successively delayed and distributed by series-connected delay circuits 302. The delay time is the chip length.

The spreading codes successively appearing between the delay circuits 302 are amplified by amplifiers 303. As indicated in the drawing, the amplifications factors are $(-r)^N$, $(-r)^{N-1}$, $(-r)^{N-2}, \ldots, (-r)^2, (-r)^1$.

Here, r is optimally made the real impulse constant defined by Eq. (2). Insofar as $-1 < r < 1$, however, it can be used to generate spreading codes for an asynchronous CDMA telecommunication system even if it does not strictly satisfy Eq. (2).

The signals amplified by the amplifiers 303 are summed by an adder 304 to successively output an optimum chaos-type spreading code sequence $Y_1, Y_2, Y_3, \ldots$.

When the code sequence is periodic, i.e., when $X_j = X_{j+N-1}$, provision of 2N−1 number of numerical values $X_1, \ldots X_{2N-1}$ is unnecessary. So long as N number of numerical values $X_1, \ldots X_N$ are available, the periodicity can be utilized to calculate $B(X_m)$ for all values of m ($0 \leq m \leq N$). The calculation time can therefore be further shortened.

It can be seen that, similarly, the product (33) of the Chebyshev polynomials is also a complete orthonormal bases on the s-dimensional cubic $[-1, 1]^s$.

$$\prod_{j=1}^{s} T(p_j, x_j) = T_{p1}(x_1) T_{p2}(x_2) \cdots T_{ps}(x_s) \quad (33)$$

In the present invention, s number of products (34) are calculated with respect to s-dimensional real numerical values $x_1, x_2, \ldots, x_s$ generated from a Chebyshev map dynamical system determined by s number of integer parameters $p_1, p_2, \ldots, p_s$ for which $q_1 \bmod p_1 \neq 0$, $q_2 \bmod p_2 \neq 0 \ldots, q_s \bmod p_s \neq 0$ respectively hold with respect to s number of prescribed positive integers $q_1, q_2 \ldots q_s$.

$$z[m] = T_{q1}(x_1[m]) T_{q2}(x_2[m]) \ldots T_{qs}(x_s[m]) \quad (34)$$
$$(1 \leq m \leq 2N-1)$$

The correlation function of the pseudo-random number spreading sequence of length N (35) composed of the calculated values $z[1], z[2], \ldots, z[2N-1]$ satisfies Eq. (1).

$$z'[1] = C \sum_{j=1}^{N} (-r)^j z[j], \quad (35)$$

$$z'[2] = C \sum_{j=1}^{N} (-r)^j z[j+1],$$

$$\vdots$$

$$z'[N] = C \sum_{j=1}^{N} (-r)^j z[j+N-1]$$

By defining r as in Eq. (2) and setting the code length N sufficiently long, therefore, interference noise variance in asynchronous CDMA using spreading codes that are s-dimensional pseudo-random number sequences generated from a direct product chaos dynamical system can, in accordance with the foregoing theory of Mazzini et al., be represented by (3) to increase the number of users at the same bit error rate reliably by 15% relative to the case of an existing asynchronous CDMA communication system.

If the topologically conjugacy relationship of (36) is satisfied with respect to a Chebyshev map $T_p(x)$ and a diffeomorphism $G(x)$, moreover, this $F_p(x)$ will also have the same Lebesgue spectrum as the Chebyshev map and, in addition, the auto-correlation function can similar construct chaos sequences that damp in the manner of $(-r)^{-1}$.

$$F_p \circ G(x) = G \circ T_p(x) \quad (36)$$

Figure 4:
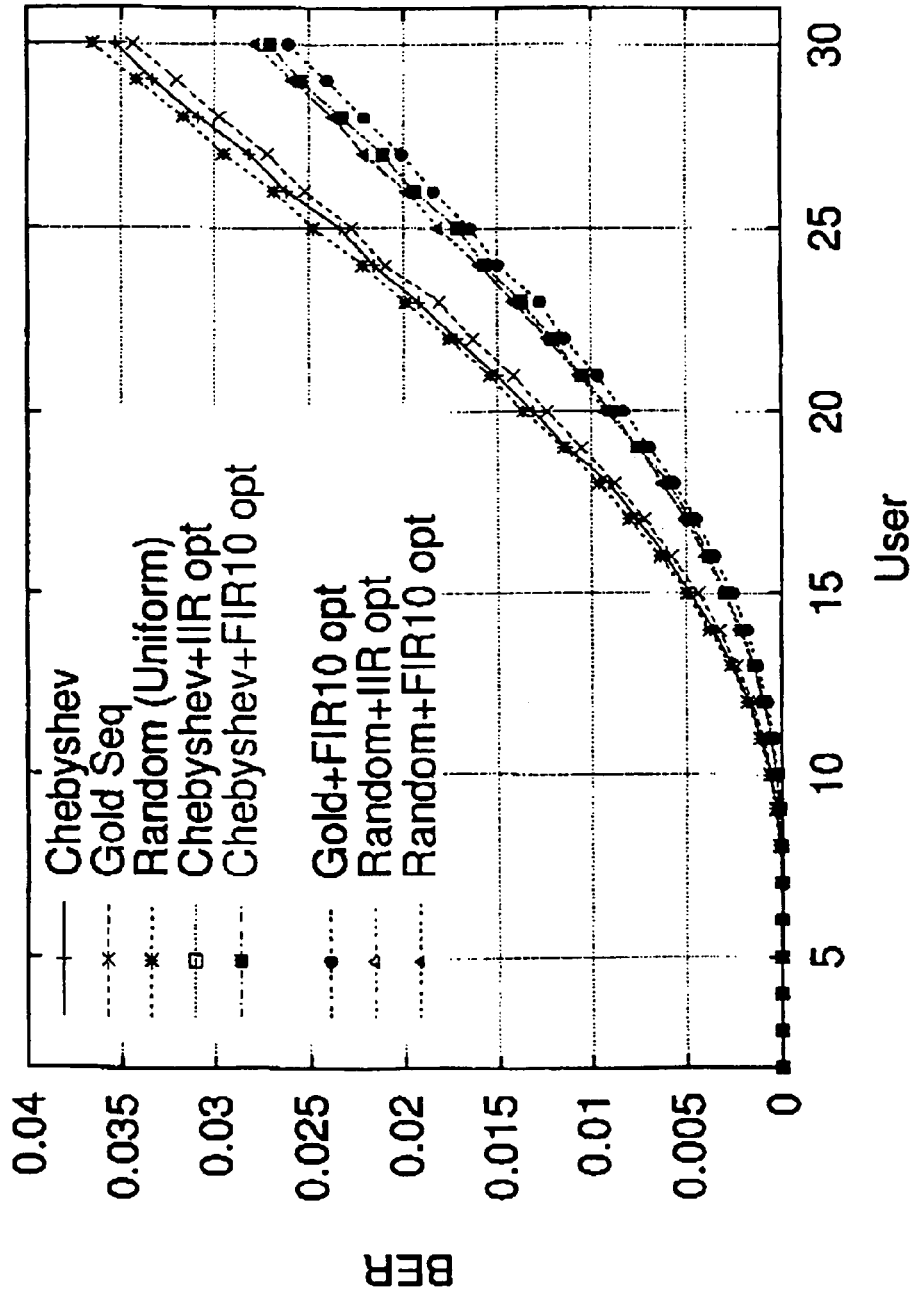
FIG. 4 is a graph showing the results of bit error rate simulation by the invention and conventional methods.
Figure 5:
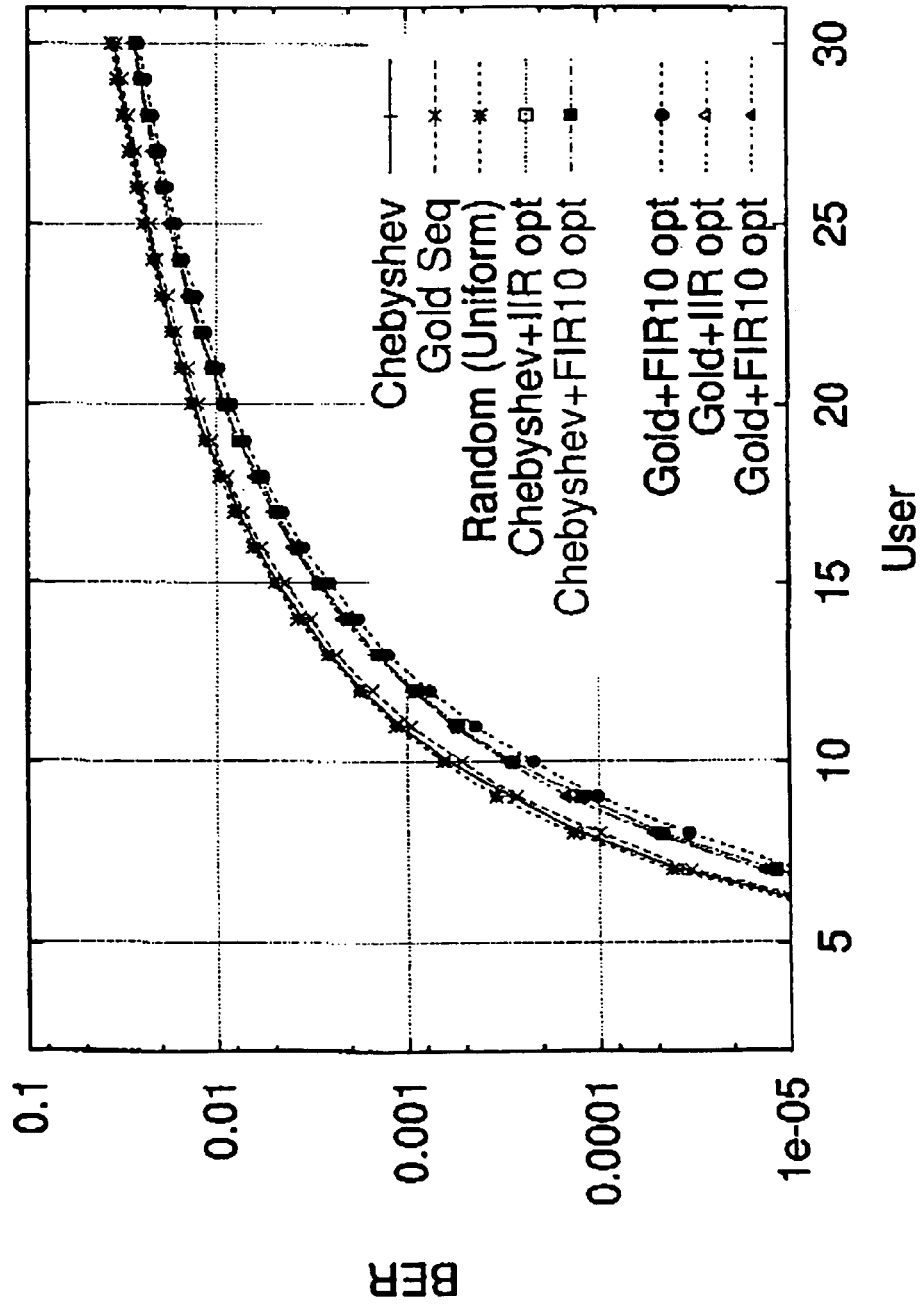
FIG. 5 is a graph showing the results of bit error rate simulation by the invention and conventional methods.

FIGS. 4 and 5 show simulation results obtained when the pseudo-random number sequence length N was fixed to 31 and bit error rate was calculated as a function of number of users for each of the present method, white noise codes and Gold codes. The following parameters were used in the present method.

s=1 p=2 (corresponding to a Chebyshev generator order of 2).
[<-modified]

The simulation results demonstrate that at the same bit error rate the present method enables a 15% increase in number of users over that in the case of the white noise codes and Gold codes which had been considered to be the optimum existing sequences.

More specifically, 28 users can communicate with bit error rate 0.023 when the present Filter method is employed, while only 25 users can communicate with the same bit error rate 0.023 when the conventional spreading sequences are employed.

Figure 6:
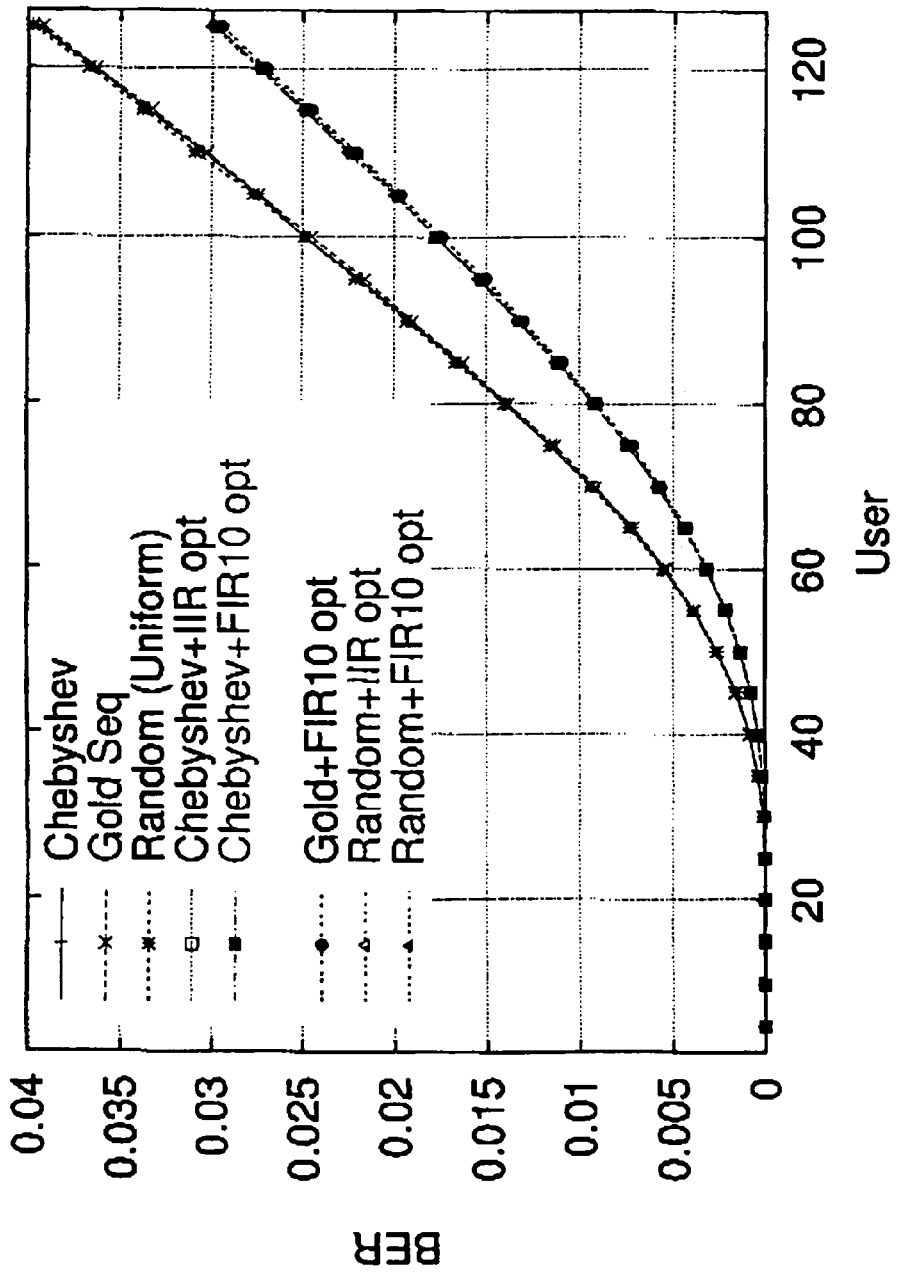
FIG. 6 is a graph showing the results of bit error rate simulation by the invention and conventional methods.
Figure 7:
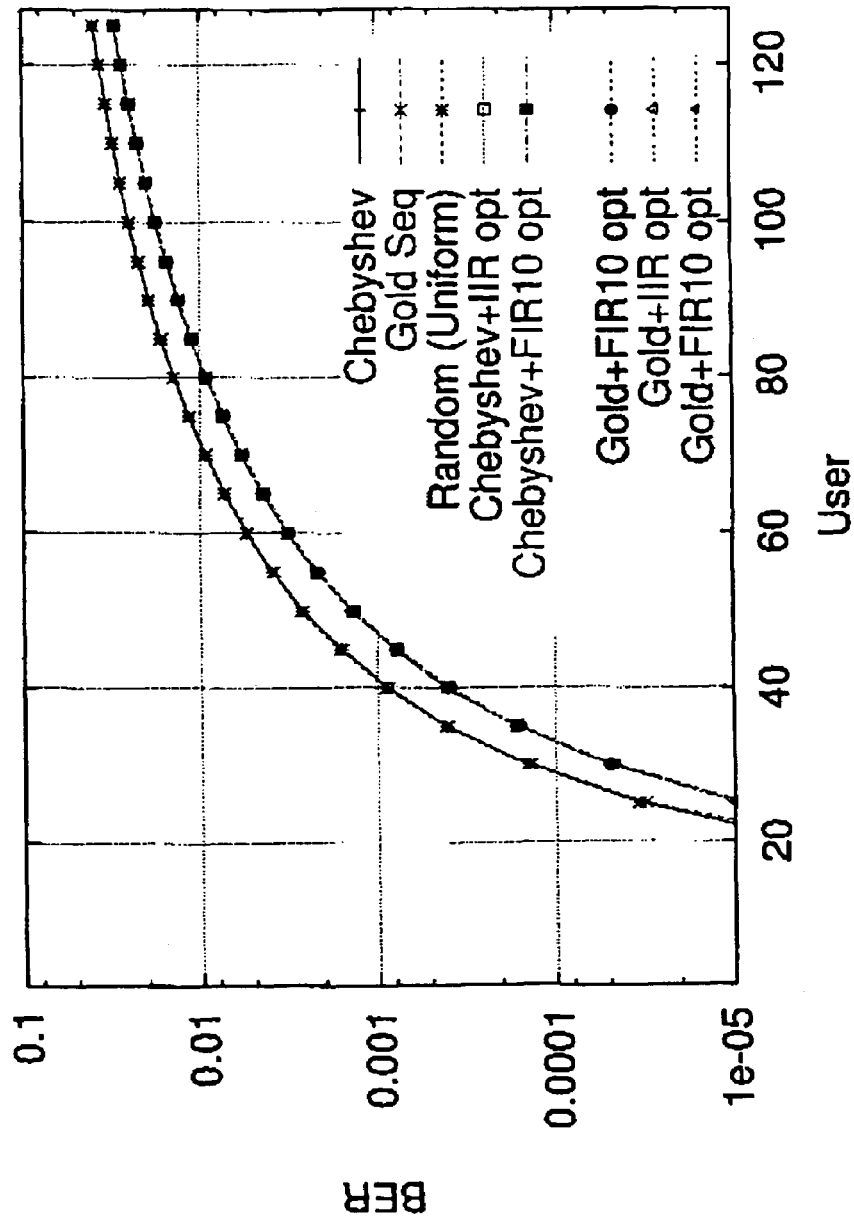
FIG. 7 is a graph showing the results of bit error rate simulation by the invention and conventional methods.

FIGS. 6 and 7 show simulation results obtained when the pseudo-random number sequence length N was fixed to 127 and bit error rate was calculated as a function of number of users for each of the present method, white noise codes and Gold codes. The following parameters were used in the present method.

s=1 p=2 (corresponding to a Chebyshev generator order of 2)

The simulation results demonstrate that at the same bit error rate the present method enables a 15% increase in number of users over that in the case of the white noise codes and Gold codes which had been considered to be the optimum existing sequences.

More specifically, 115 users can communicate with bit error rate 0.025 when the present Filter method is employed, while only 100 users can communicate with the same bit error rate 0.025 when the conventional spreading sequences are employed.

Such simulation results as shown in FIGS. 4 to 7 are very robust under the finite precision effect of digital computers. This finding is to be published in a paper reporting the joint work of four researchers including the inventor: C. C. Chen, K. Yao, K. Umeno, E. Biglieri "Applications of Chaotic Dynamical Systems and Ergodic Theory to the Design of Spread Spectrum Sequences" (preprint submitted to IEEE trans. on Circuits and Systems. Submission date: Jan. 31, 2000).

This embodiment thus overcomes the five problems explained earlier.

Figure 8:
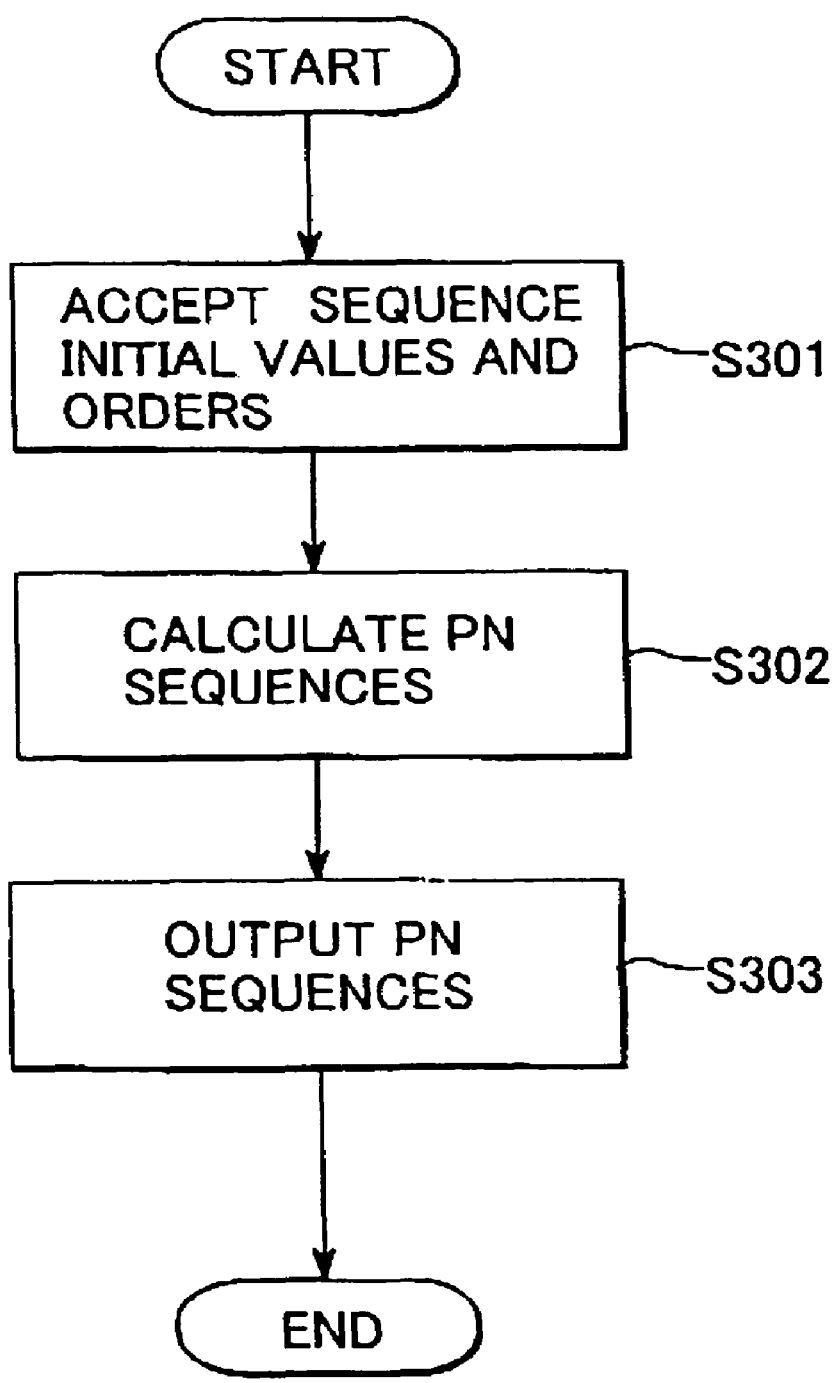
FIG. 8 is a flowchart showing the sequence of processing steps of the invention pseudo-random number sequence output method.

FIG. 8 is a flowchart showing the sequence of processing steps executed by the pseudo-random sequence output unit 101, i.e., the processing of the invention pseudo-random number sequence output method.

The pseudo-random sequence output unit 101 accepts the sequence initial values and integer parameters (orders) (step S301), uses them and the aforesaid recurrence formula to calculate a pseudo-random number sequence (step S302), and outputs the calculated pseudo-random number sequence (step S303) to complete the processing.

The pseudo-random number sequence output method of the present invention can thus be readily implemented with a general-purpose computer, parallel computer, mobile terminal (particularly a telecommunication terminal), game device or other such data processing system.

The pseudo-random number sequence output method of the present invention can also be readily implemented with a DSP, FPGA (Field Programmable Gate Array) or other such digital processing circuit.

Embodiment of Transmitter

Figure 9:
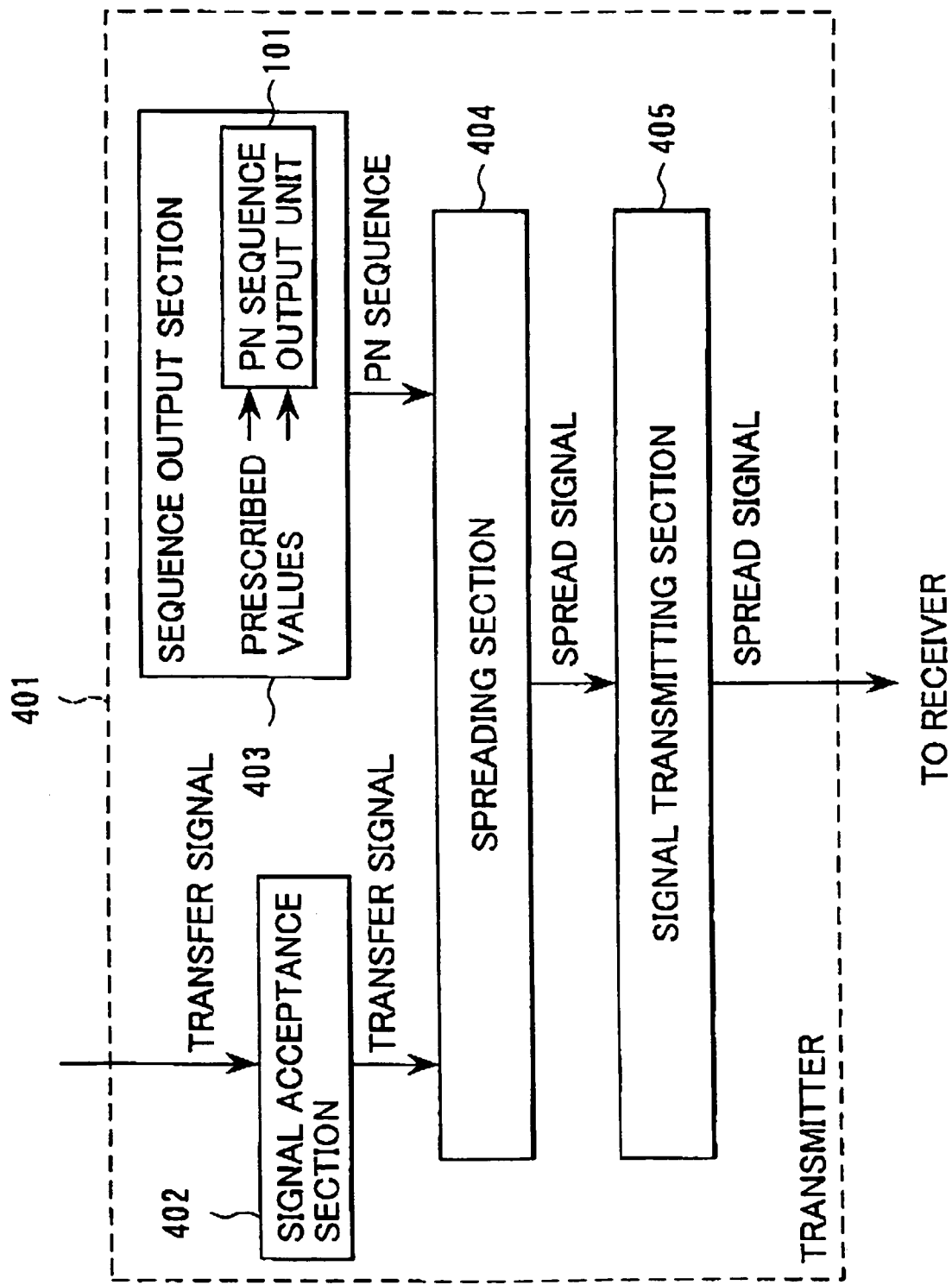
FIG. 9 is a schematic diagram showing the general configuration of a transmitter according to the present invention.

FIG. 9 is a schematic diagram showing the general configuration of a transmitter 401 according to the present invention. Elements similar to those in the foregoing figures are assigned like reference symbols. Explanation will now be made with reference to FIG. 9.

The transmitter 401 comprises a signal acceptance section 402, sequence output section 403, a spreading section 404 and a signal transmitting section 405. The sequence output section 403 is equipped with the pseudo-random sequence output unit 101, which it controls.

The signal acceptance section 402 accepts the signal to be transmitted. In the case of a mobile phone or PHS, the signal for transmission is typically a voice signal. In the case of digital telecommunication, it is an electric digital signal. In the case of optical telecommunication, the optical signal can be converted to an electric signal and the electric signal accepted. Or, if the pseudo-random sequence output unit 101 is implemented as an optical computer, the optical signal can be accepted as it is.

The sequence output section 403 causes the pseudo-random sequence output unit 101 provided therein to accept sequence initial values and integer parameters (orders) assigned to the transmitter 401. The pseudo-random sequence output unit 101 produces pseudo-random number sequences as explained earlier and the sequence output section 403 outputs them.

Different transmitters 401 can in advance be assigned sequence initial values and integer parameters (orders) of different values. Many communication terminals store a production serial number, product number, approval number and the like in a ROM (Read Only Memory). The sequence initial values and integer parameters (orders) can similarly be stored in a ROM beforehand so that the transmitter 401 can use the same sequence initial values and integer parameters (orders) at all times. Another possible method is to store multiple types of sequence initial values and integer parameters (orders) in the ROM and randomly select the ones to be used at the time of each communication.

In the case of such an embodiment, the receiver communicating with the transmitter 401 must somehow be informed of the sequence initial values and integer parameters (orders) stored in the ROM. When the transmitter and the receiver are paired, they can be embodied to use the same sequence initial values and integer parameters (orders).

When multiple types of sequence initial values and integer parameters (orders) are provided, the ones used by the transmitter 401 can be determined by correlation detection as explained later. It is also possible to prepare the sequence initial values using chaos random number sequences obtained by use of a recurrence formula based on Chebyshev polynomials. In addition, as explained later, public key encryption can be used to secure sharing of sequence initial values and integer parameters (orders) between the transmitter 401 and the receiver.

The spreading section 404 effects direct spectrum spreading by successively multiplying the signal for transmission accepted by the signal acceptance section 402 by the elements of the pseudo-random number sequences output by the sequence output section 403. A method will be explained here in which the value of the signal at time t is defined as s(t) and the signal s(t) is successively multiplied by the sequence elements.

When the elements of a sequence of length N are used, the period of "successive multiplication of the signal s(t) by the sequence elements" resulting from these elements and the chip length w is Nw.

When "signal s(t) is successively multiplied by the sequence elements" starting from a prescribed time $t_0$, the signal s(t) is discretized by chip length w so as to obtain the required quality. Conceivable techniques for this include, for instance, that of obtaining a value of signal s(t) for each chip length w and that of obtaining the average value of signal s(t) during chip length w. In the interest of clarity, the former method will be explained here.

The chip length w must be long enough to enable the receiver to decode the information of the signal for transmission sufficiently at the required quality. An appropriate chip length can be selected by a conventional method.

If an appropriate chip length w is selected, a signal that is not so degraded compared to the original signal for transmission can be obtained by successively outputting the discretized signal sequence for the selected chip length time w.

The discretized signal can be expressed by a number sequence such as the following.

$$s(t_0), s(t_{0+w}), s(t_{0+2w}), s(t_{0+3w}), s(t_{0+4w}), \ldots$$

This can expressed with regard to integer i ($0 \leq i$) as $s_i = s(t_{0+iw})$.

In the method that takes the average value of signal s(t) during chip length w, the following expression is possible.

$$s_i = (1/w) \int_0^w s(t_0 + iu) du$$

The signals $s_i$ ($0 \leq i$) are ones obtained by discretizing the signal for transmission at the required quality.

The signal sequence after direct spectrum spreading of this signal sequence is $$s_0 z'[1], s_1 z'[2], \ldots, s_{N-1} z'[N], s_N z'[1], s_{N+1} z'[2],$$

In other words, the general term of this number sequence with respect to integer i ($0 \leq i$) is $s_i \times z'[(i \mod N)+1]$. x mod y means the remainder when x is divided by y.

Transmission of the elements of this signal sequence for the time of each chip length enables transmission of an accepted signal for transmission of prescribed time length in the same time length.

Figure 10:
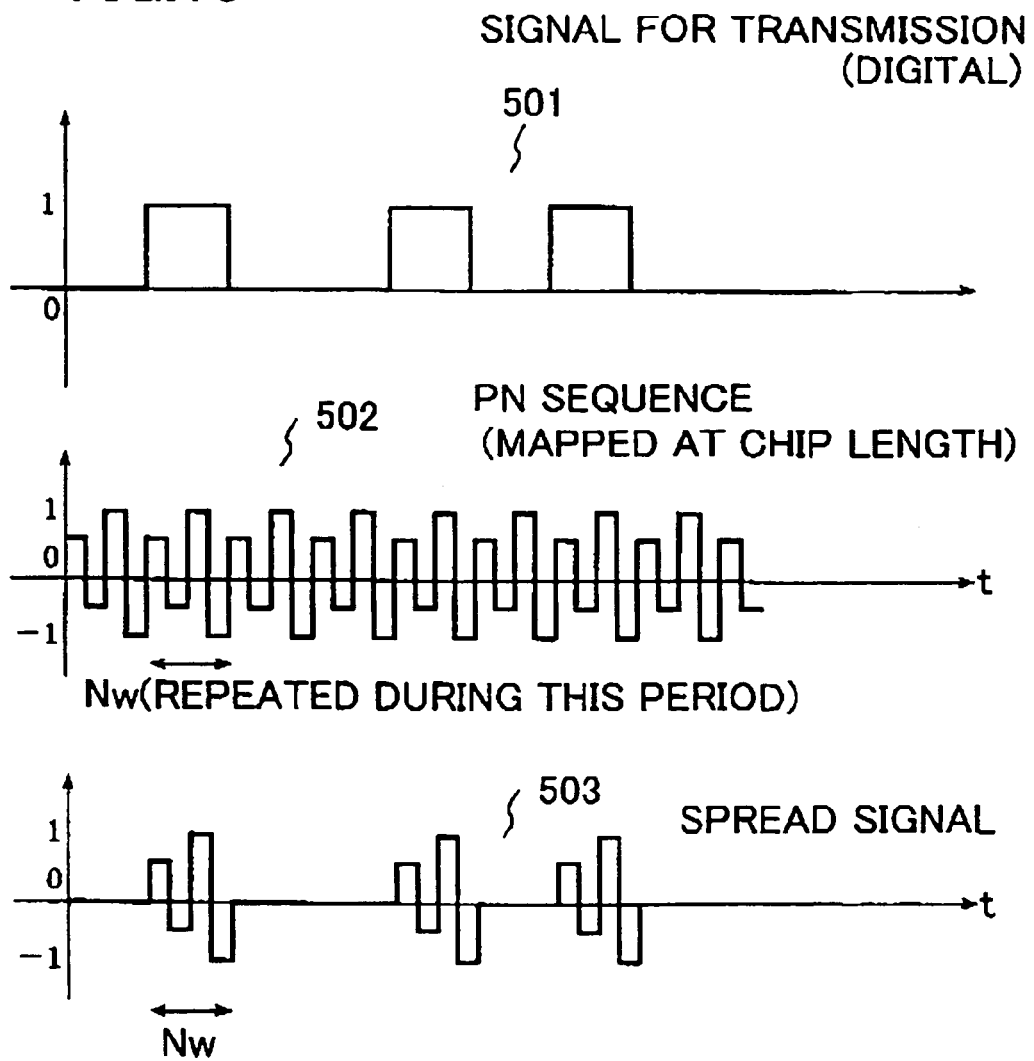
FIG. 10 is diagram for explaining direct sequence spectrum spreading.

FIG. 10 illustrates direct spectrum spreading. The signal for transmission 501 accepted by the signal acceptance section 402 is repeatedly multiplied by the elements of the pseudo-random number sequence 502 output by the sequence output section 403 to produce the signal 503 output by the spreading section 404.

The signal transmitting section 405 transmits the signal 503 output by the spreading section 404. The transmission is, for example, conducted via an antenna in the case of a mobile phone or PHS, via a wire telephone line or wire/wireless LAN in the case of a computer network, or via an optical cable.

Embodiment of Receiver

Figure 11:
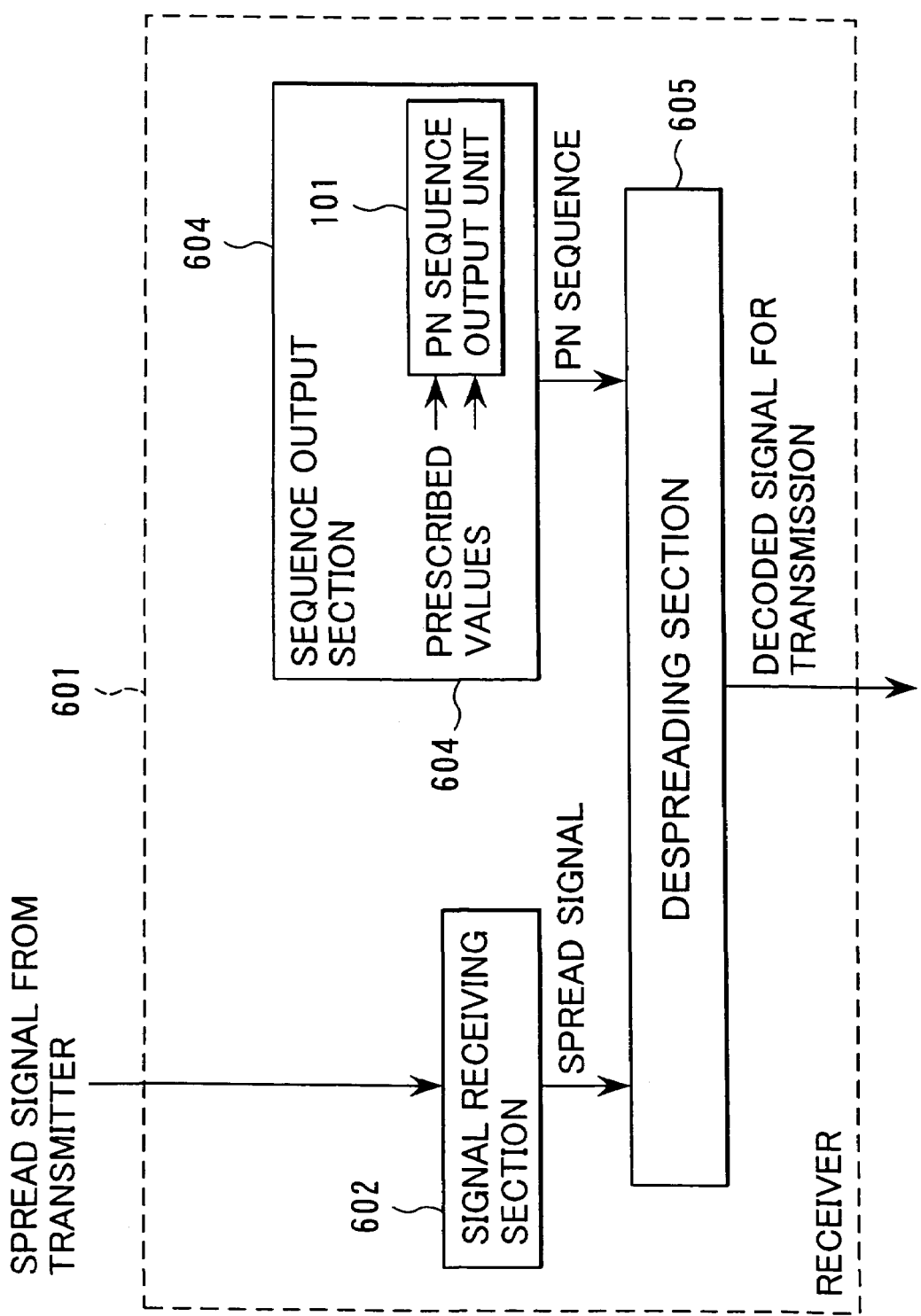
FIG. 11 is a schematic diagram showing the general configuration of a receiver according to the present invention.

Like the transmitter, the receiver of the present invention uses the pseudo-random number sequence output unit to produce pseudo-random number sequences. In the receiver, these pseudo-random number sequences are used as spreading codes for inverse direct spectrum spreading. FIG. 11 is a schematic diagram showing the general configuration of a receiver 601 according to the present invention. Explanation will now be made with reference to FIG. 11.

The receiver 601 is equipped with a signal receiving section 602, a sequence output section 604 and an inverse spreading section 605.

The signal receiving section 602 receives the signal transmitted by the transmitter 401. The signal receiving section 602 is constituted as an interface with, for example, an antenna, telephone line, optical fiber line or the like.

The signal received by the signal receiving section 602 includes the signal transmitted by the transmitting party's transmitter 401 and noise. In order to eliminate unneeded signals, the receiver 601 uses pseudo-random number sequences that are identical to the pseudo-random number sequences used by the transmitter 401 for direct spectrum spreading. The sequence output section 604 causes the pseudo-random sequence output unit 101 to accept the sequence initial values and integer parameters (orders) used by the transmitting party's transmitter 401, thereby enabling it to output the pseudo-random number sequences. The sequence output section 604 of the receiver 601 in this embodiment is therefore identical to the sequence output section 403 of the transmitter 401.

The signal for transmission accepted by the transmitting party's transmitter 401 can be despread by inverse direct spectrum spreading the signal transmitted by the transmitting party's transmitter 401, i.e., by successively multiplying it by the same pseudo-random number sequence elements. If synchronization has been established, successive multiplication of the received signal sequence $s_0 z'[1], s_1 z'[2], \ldots, s_{N-1} z'[N], s_N z'[1], s_{N+1} z'[2], \ldots$ by the pseudo-random number sequence element $z'[1], z'[2], \ldots, z'[N]$ produces the decoded information of the signal for transmission at the required quality in the form of the signal sequence $S_0, S_1, \ldots, S_{N-1}, S_N, S_{N+1}, \ldots$.

Synchronization can be achieved by the correlation detection mentioned earlier or by clock sharing or any of various other methods, all of which are encompassed by the present invention.

As explained below, utilization of public-key encryption in the transmitter 401 and receiver 601 enables a generator section 611 (FIG. 12) of the receiver to generate the same sequence initial values and integer parameters (orders) as the transmitter 401.

First, the receiver 601 generates a public key and a private key. The receiver 601 then transmits the public key to the transmitter 401. The transmitter 401 uses the public key to encrypt the sequence initial values and integer parameters (orders) it uses and transmits encrypted values and parameters (orders) to the receiver 601. The receiver 601 uses the private key to decrypt the received encrypted signal and thus obtain the sequence initial values and the integer parameters (orders).

The chaotic key distribution method taught by the inventor's Japanese Patent Application No. 11-152063 can be used as the public-key encryption method.

Embodiment for Correlation Detection

When the transmitter 401 effects direct spectrum spreading using a selected one of multiple pseudo-random number sequences, the receiver 601 can discriminate the selected pseudo-random number sequence by correlation detection. It can also use correlation detection for inverse direct spectrum spreading synchronization.

An embodiment of the invention receiver capable of correlation detection will now be explained with reference to FIG. 12. Elements in FIG. 12 similar to those in the foregoing figures are assigned like reference symbols.

Figure 12:
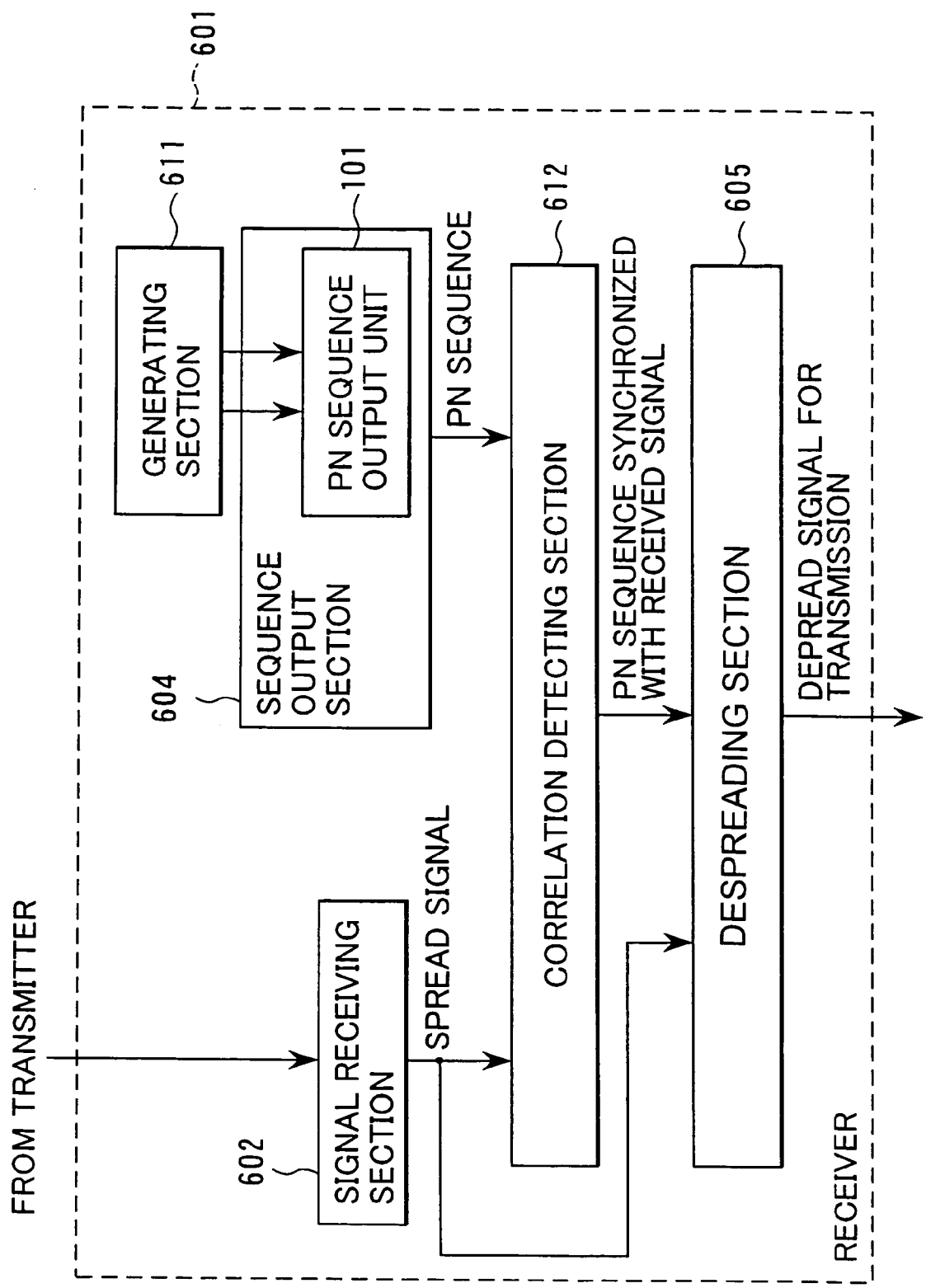
FIG. 12 is a schematic diagram showing an embodiment of a receiver enabling correlation detection.

In addition to having the signal receiving section 602, sequence output section 604 and inverse spreading section 605, the receiver 601 of FIG. 12 is further equipped with a generating section 611 and a correlation detecting section 612.

The generating section 611 outputs sets of sequence initial values and integer parameters (orders) selectable by the transmitter 401. Output of a single pseudo-random number sequence is also acceptable. In this case, owing to the need to select one set from among multiple sets of sequence initial values and integer parameters (orders), the correlation detecting section 612 functions to synchronize the signals.

In response to the sequence initial values and integer parameters (orders) generated by the generating section 611, the sequence output section 604 outputs every pseudo-random number sequence selectable by the transmitter 401.

The correlation detecting section 612 attempts correlation detection with respect to every pseudo-random number sequence output by the sequence output section 604. Correlation detection is carried out by successively multiplying the received signal by "elements" of the pseudo-random number sequence to be checked. The correlation detection can be done using a conventional technique known to the art.

The pseudo-random number sequences used in the present invention are excellent in correlation characteristic. When the receiver 601 selects a different pseudo-random number sequence, therefore, the strength of the signal after multiplication is extremely weak and the correlation detection fails.

On the other hand, when the same pseudo-random number sequence as that of the transmitter 401 is selected and correlation detection is conducted, the strength of the signal after multiplication exceeds a prescribed value. In addition, signal synchronization can be achieved by shifting the pseudo-random number sequence offset to synchronize with the received signal.

The inverse spreading section 605 despreads the signal for transmission by successively multiplying the signal received by the signal receiving section 602 by the reciprocals of the elements of the pseudo-random number sequence that the correlation detecting section 612 has selected and synchronized with the received signal.

Unlike the correlation detecting section 612, which successively multiplies the received signal by the "elements" of the pseudo-random number sequence, the inverse spreading section 605 successively multiplies the received signal by the "reciprocals of the elements" of the pseudo-random number sequence. Thus the correlation detecting section 612 calculates correlation/cross-correlation, while the inverse spreading section 605 carries out despreading.

Embodiment of Communication System

The communication system of the present invention can be configured from the transmitter 401 and the receiver 601, which receives the signal transmitted by the transmitter 401 and despreads the signal for transmission. Despreading of the signal for transmission fails when the transmitter 401 and receiver 601 use different pseudo-random number sequences.

Therefore, even when multiple transmitters 401 and receivers 601 communicate on the same frequency band, intercommunication can be conducted while preserving privacy and also assuring communication quality commensurate with the number of users.

The pseudo-random number sequences generated according to the present invention are particularly advantageous in that they enable a greater stepwise increase in the number of code types than possible with conventional pseudo-random number sequences and, as such, are highly suitable for CDMA communication including a large number of latent users.

FIG. 13a illustrates in more detail an embodiment of the transmitter shown in FIG. 9. In particular, the sequence output section 403 includes a selecting section that selects the sequence initial values $Y_1, Y_2, \ldots, Y_s$ and the integer parameters $p_1, p_2, \ldots, p_s$; a parameter transmitting section that transmits the selected sequence initial values $Y_1, Y_2, \ldots, Y_s$ and integer parameters $p_1, p_2, \ldots, p_s$; and a pseudo-random number sequence output unit that accepts input of the selected sequence initial values $Y_1, Y_2, \ldots, Y_s$ and integer parameters $p_1, p_2, \ldots, p_s$ and outputs the pseudo-random number sequence of length N. The remaining elements of FIG. 13a correspond the corresponding elements shown in FIG. 9.

Similarly, FIG. 13b illustrates in more detail an embodiment of the receiver shown in FIG. 11. In particular the sequence output section 604 includes a selecting section that selects the sequence initial values $Y_1, Y_2, \ldots, Y_s$ and the integer parameters $p_1, p_2, \ldots, p_s$; a parameter transmitting section that transmits the selected sequence initial values $Y_1$, $Y_2, \ldots, Y_s$ and integer parameters $p_1, p_2, \ldots, p_s$; and a pseudo-random number sequence output unit that accepts input of the selected sequence initial values $Y_1, Y_2, \ldots, Y_s$ and integer parameters $p_1, p_2, \ldots, p_s$ and outputs the pseudo-random number sequence of length N.

As explained in the foregoing, the present invention provides a pseudo-random number sequence output unit, transmitter, receiver, communication system and filter unit, and a pseudo-random number sequence output method, transmission method, receiving method and filtering method that are suitable for an asynchronous CDMA communication system, and a data recording medium recorded with a program for implementing any of the foregoing.

What is claimed is:

1. A filter unit for filtering a prescribed real impulse constant r satisfying $2-\sqrt{3}-0.1 \leq r \leq 2-\sqrt{3}+0.1$, the filter unit comprising:
   an input terminal that accepts input of a Chebyshev chaos-type spreading code sequence $X_n$, wherein $1 \leq n \leq N$, and N is an integer equal to 1 or more, the spreading code sequence being an input signal of chip length D;
   a delay section that includes (N−1) series-connected delay circuits for delaying by the chip length D of the spreading code sequence $X_n$ whose input was accepted, and outputs a plurality of signals produced by delaying the spreading code sequence by a delay time T=0, D, 2D, 3D, . . . , (N−1)D;
   an amplifying section that includes N series-connected amplifiers for amplifying the delayed signals output from the delay circuits by amplification factors $(-r)^{N-T/D}$ when the delay time is T, and outputs the amplified signals;
   an adder section that sums the amplified signals output from the N amplifiers and outputs the resulting sum signal; and
   an output terminal that outputs the sum signal as a signal of an optimal chaotic spreading sequence.

2. The filter according to claim 1, wherein one or more of the delay section, the amplifying section, and the adder section of the filter unit are constituted as an ASIC (Application Specific Integrated Circuit), a DSP (Digital Signal Processor), or an FPGA (Field Programmable Gate Array).

3. A method for filtering a prescribed real impulse constant r satisfying $2-\sqrt{3}-0.1 \leq r \leq 2-\sqrt{3}+0.1$, the filter unit comprising:
   accepting input of a Chebyshev chaos-type spreading code sequence $X_n$, wherein $1 \leq n \leq N$, and N is an integer equal to 1 or more, the spreading code sequence being an input signal of chip length D;
   delaying the spreading code sequence $X_n$ by the chip length D of the spreading code sequence $X_n$ whose input was accepted using (N−1) series-connected delay circuits and outputting a plurality of signals produced by delaying the spreading code sequence by a delay time T=0, D, 2D, 3D, . . . , (N−1)D;
   amplifying, using N series-connected amplifiers, the delayed signals output from the delay circuits by amplification factors $(-r)^{N-T/D}$ when the delay time is T, and outputting the amplified signals;
   summing the amplified signals output from the N amplifiers and outputting the resulting sum signal; and
   outputting the sum signal as a signal of an optimal chaotic spreading sequence.

4. A computer-readable data recording medium recorded with a program that enables any of a computer, a DSP (Digital Signal Processor), and a FPGA (Field Programmable Gate Array) to function as a filter unit for filtering a prescribed real impulse constant r satisfying $2-\sqrt{3}-0.1 \leqq r \leqq 2-\sqrt{3}+0.1$, the filter unit comprising:

an input terminal that accepts input of a Chebyshev chaos-type spreading code sequence $X_n$, wherein $1 \leqq n \leqq N$, and N is an integer equal to 1 or more, the spreading code sequence being an input signal of chip length D;

a delay section that includes (N−1) series-connected delay circuits for delaying by the chip length D of the spreading code sequence $X_n$ whose input was accepted, and outputs a plurality of signals produced by delaying the spreading code sequence by a delay time T=0, D, 2D, 3D, ..., (N−1)D;

an amplifying section that includes N series-connected amplifiers for amplifying the delayed signals output from the delay circuits by amplification factors $(-r)^{N-T/D}$ when the delay time is T, and outputs the amplified signals;

an adder section that sums the amplified signals output from the N amplifiers and outputs the resulting sum signal; and an output terminal that outputs the sum signal as a signal of an optimal chaotic spreading sequence.

5. A data recording medium according to claim 4 wherein the data recording medium is a compact disk, floppy disk, hard disk, magneto-optical disk, digital video disk, magnetic tape, or semiconductor memory.

* * * * *